United States Patent
Sharifi et al.

(10) Patent No.: US 11,748,660 B2
(45) Date of Patent: Sep. 5, 2023

(54) AUTOMATED ASSISTANT TRAINING AND/OR EXECUTION OF INTER-USER PROCEDURES

(71) Applicant: Google LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

(*) Notice: Subject to any disclaimer, the term of this patent is extended or adjusted under 35 U.S.C. 154(b) by 194 days.

(21) Appl. No.: 17/028,262

(22) Filed: Sep. 22, 2020

(65) Prior Publication Data

US 2022/0083908 A1 Mar. 17, 2022

Related U.S. Application Data

(60) Provisional application No. 63/079,811, filed on Sep. 17, 2020.

(51) Int. Cl.
*G06N 20/00* (2019.01)
*G10L 15/22* (2006.01)
(Continued)

(52) U.S. Cl.
CPC .......... *G06N 20/00* (2019.01); *G06F 3/0488* (2013.01); *G06F 3/167* (2013.01); *G06F 18/214* (2023.01);
(Continued)

(58) Field of Classification Search
None
See application file for complete search history.

(56) References Cited

U.S. PATENT DOCUMENTS 10,269,351 B2 * 4/2019 Aggarwal .............. G10L 25/51
10,366,291 B2 * 7/2019 Nowak-Przygodzki .....................
G06F 3/017
(Continued)

OTHER PUBLICATIONS

European Patent Office; International Search Report and Written Opinion issued in PCT Application No. PCT/US2021/050388; 14 pages; dated Dec. 20, 2021.

*Primary Examiner* — Ryan Barrett
(74) *Attorney, Agent, or Firm* — Gray Ice Higdon

(57) ABSTRACT

Implementations relate to an automated assistant that can automate repeatedly performed procedures. The automation can involve communicating with different users, organizations, and/or other automated assistants. The automated assistant, with prior permission from respective user(s), can detect repeated performance of a particular series of manually initiated computational actions. Based on this determination, the automated assistant can determine automated assistant computational action(s) that can be performed by the automated assistant in order to reduce latency in performing a procedure, reduce quantity and/or size of transmissions in performing the procedure, and/or reduce an amount of client device resources required for performing the procedure. Such actions can include communicating with an additional automated assistant that may be associated with another user and/or organization. In these and other manners, manually initiated computational actions that include electronic communications amongst users can be converted to backend operations amongst instances of automated assistants to achieve technical benefits.

20 Claims, 12 Drawing Sheets

(51) Int. Cl.
*G06F 3/16* (2006.01)
*G06F 3/0488* (2022.01)
*G06F 18/22* (2023.01)
*G06F 18/214* (2023.01)

(52) U.S. Cl.
CPC .............. *G06F 18/22* (2023.01); *G10L 15/22* (2013.01); *G10L 2015/223* (2013.01)

(56) References Cited

U.S. PATENT DOCUMENTS

| | | | |
|---|---|---|---|
| 10,453,456 B2 * | 10/2019 | Nicholls | G06N 3/084 |
| 11,100,384 B2 * | 8/2021 | Finkelstein | G06N 5/04 |
| 2004/0143628 A1 * | 7/2004 | Bradford | G05B 19/054 |
| | | | 709/203 |
| 2006/0141990 A1 * | 6/2006 | Zak | G06F 3/0237 |
| | | | 455/412.1 |
| 2012/0016678 A1 * | 1/2012 | Gruber | G10L 13/02 |
| | | | 704/E21.001 |
| 2016/0360382 A1 * | 12/2016 | Gross | G06F 9/453 |
| 2017/0149703 A1 * | 5/2017 | Willett | H04W 4/21 |
| 2018/0150280 A1 * | 5/2018 | Rhee | G06F 9/451 |
| 2018/0173403 A1 | 6/2018 | Carbune et al. | |
| 2019/0102687 A1 * | 4/2019 | Terra | G06N 20/00 |
| 2019/0103101 A1 * | 4/2019 | Danila | G10L 15/30 |
| 2020/0143114 A1 * | 5/2020 | Dua | G06F 3/167 |
| 2020/0175983 A1 | 6/2020 | Soodman | |
| 2020/0184956 A1 * | 6/2020 | Agarwal | G10L 15/07 |
| 2020/0342865 A1 * | 10/2020 | Davies | G10L 15/22 |
| 2020/0372224 A1 * | 11/2020 | Azmoon | H04M 3/5133 |
| 2020/0379726 A1 * | 12/2020 | Blatz | G06F 3/04842 |
| 2021/0065701 A1 * | 3/2021 | van Scheltinga | G10L 15/083 |
| 2021/0335348 A1 * | 10/2021 | Aggarwal | G06F 3/167 |
| 2022/0067551 A1 * | 3/2022 | Wei | G06N 5/046 |
| 2022/0124055 A1 * | 4/2022 | Sharifi | H04L 51/02 |

* cited by examiner

US 11,748,660 B2

AUTOMATED ASSISTANT TRAINING AND/OR EXECUTION OF INTER-USER PROCEDURES

BACKGROUND

Humans may engage in human-to-computer dialogs with interactive software applications referred to herein as "automated assistants" (also referred to as "digital agents," "chatbots," "interactive personal assistants," "intelligent personal assistants," "conversational agents," etc.). For example, humans (which when they interact with automated assistants may be referred to as "users") may provide commands and/or requests using spoken natural language input (i.e., utterances) which may in some cases be converted into text and then processed, and/or by providing textual (e.g., typed) natural language input.

A variety of people in an organization may have access to their own respective automated assistant in a variety of different contexts, such as when an individual user is at home or at work. For example, when a user is at work, they may invoke an automated assistant to set a reminder about a meeting later that day. However, in order to accomplish more collaborative tasks, the user may interact with a variety of different people and/or applications. For instance, when a task at a particular organization involves submitting a request to another organization, a procedure for compiling the request may typically involve multiple electronic correspondences between persons at that particular organization. Because each correspondence can involve accessing a computing device for a period of time, various computational resources of the organization can be consumed as a result of users repeatedly performing such tasks. For example, each person in the organization may continue to rely on direct correspondence, such as emails and phone calls, with other persons in the organization in order to complete organization-related tasks. This may unnecessarily cause users to initialize their respective computing devices to reply to messages, thereby inefficiently consuming power of any devices that are involved.

SUMMARY

Implementations set forth herein relate to an automated assistant that can, with permission(s) from respective user(s), detect procedures that embody various persons and/or information sources to contribute to such procedures. A particular procedure performed, in whole or in part by a user, can be detected despite the user explicitly indicating what computational action(s) performed by the user relate to the procedure and/or without even explicitly indicating to the automated assistant that a procedure is being performed. Moreover, the computational action(s) that are related to the procedure can be differentiated from those that are irrelevant to the procedure, despite the irrelevant computational action(s) intervening between computational actions that are related to the procedure. In these and other manners, training of an automated assistant to perform certain procedures can be accomplished without the user explicitly identifying each portion of a procedure and/or without the user specifically requesting that the automated assistant learn certain procedures. This can preserve computational resources that can otherwise be consumed when a user is directly interacting with an automated assistant. This can additionally or alternatively enable self-recognition, by the automated assistant, of a variety of different procedures that can be automated to conserve various computational resources. Further, the automated assistant can self-train to perform at least some of the computational actions of the procedure and/or alternate more computationally efficient actions, without requiring user(s) of the organization to manually train the automated assistant with respect to each particular procedure. Yet further, since several instances of the automated assistant can be invoked at any given time for training, the automated assistant can be trained intermittently and/or concurrently with respect to certain candidate procedures.

In some implementations, training of the automated assistant with respect to a particular procedure can be initialized when the automated assistant determines that the user has performed the particular procedure to completion one or more times. For example, a procedure can begin with a user receiving an incoming message with certain content, and the procedure can end with the user responding to the message with other content. Furthermore, the user can perform various other tasks/computational actions between the beginning and end of the procedure such as, responding to other messages and/or accessing various documents. When the automated assistant detects that the beginning and ending of the procedure is repetitiously performed, along with other intermediary tasks, the automated assistant can initialize training in order to learn to assist the user with (i.e., semi-automate), and/or fully take over performing (i.e., automate), the procedure. In some implementations, initialization of the training for a particular procedure can be performed when the automated assistant determines that, by assisting the user with that particular procedure, the automated assistant can reduce an amount of time and/or reduce a quantity of resources that would be consumed to otherwise complete the procedure.

In some implementations, a particular procedure detected by an automated assistant can have one or more tasks that are to be accomplished via interaction with multiple different applications, persons, organizations, and/or any other apparatus and/or entity. When a particular task of a detected procedure is uncertain from the perspective of the automated assistant, the automated assistant can prompt a particular user for clarity regarding the particular task. For instance, a particular task in a procedure can include retrieving a sample of data from a dynamic data source, such as a website that provides quantities of available items. However, when the user has a history of selecting different items during completion of an otherwise routine procedure, the automated assistant can designate a particular task in the procedure as a decision point. This can allow the automated assistant to either be further trained regarding how to handle the decision point and/or prompt the user regarding the decision point each time the procedure is executed.

In some instances, a user can explicitly invoke the automated assistant in order to familiarize the automated assistant with a procedure, so that the user can employ the automated assistant to subsequently perform the procedure—and optionally, without explicit invocation. In some implementations, a procedure can refer to a series of tasks and/or computational actions that can be performed by the automated assistant, with or without the assistance of one or more users. For example, the user can provide a spoken utterance such as, "Assistant, let me show you how to respond to an email that includes a request to reserve an office" in order to initialize training for a "reservation" procedure. Thereafter, the automated assistant can detect, with prior permission from the user, various tasks completed by the user, as well as identify a conclusory action that identifies an end to the "reservation" procedure. For instance, the user can start the procedure by accessing an email that is requesting to reserve office space from the user, and the user can end the procedure by sending a responsive message that confirms a reservation of certain office space.

In some implementations, a starting point of a procedure can be identified by the automated assistant using a variety of different data. For example, application data, corresponding to an application being accessed by the user, can be processed in order to identify one or more operations being performed by the application. In some instances, the user can expressly identify a beginning of a procedure by providing a spoken utterance such as, "Assistant, I am beginning a 'reservation' procedure." Alternatively, or additionally, the application data and/or contextual data can be processed in order to identify a starting point of a procedure without a direct input from the user to the automated assistant. For example, the automated assistant can determine that the "reservation" procedure is beginning based on contextual data that indicates an email application is in a foreground of a graphical user interface (GUI). Alternatively, or additionally, the automated assistant can determine that the "reservation" procedure is beginning further based on the application data indicating that an email has been received with content such as the phrase "office reservation" and/or any other procedure-relevant information (e.g., any information that is associated with beginning the "reservation" procedure). Alternatively, or additionally, actions of a user at one or more devices and/or one or more applications can be correlated to the "reservation" procedure using a classification model. The classification model can be a trained machine learning model that is trained based on prior interactions between one or more users and/or one or more applications during prior performances of the "reservation" procedure.

In some implementations, parameters for certain procedure tasks can incorporate data derived during interactions between various sources of information. Furthermore, selection of a particular source can be inferred from prior instances in which the user performed the procedure. For instance, during prior occasions in which the user was executing the "reservation" procedure, the automated assistant can determine that the user typically issues a correspondence after accessing the email and checks an office occupancy database (e.g., the correspondence can inquire about office availability at different locations). Furthermore, the correspondence can be addressed to a first entity (e.g., a first office location) when the context of the start of the procedure corresponds to a first context (e.g., the database indicates that there is availability at the first office location). However, the correspondence can be addressed to a second entity (e.g., a second office location) when the context of the start of the procedure corresponds to a second context (e.g., the database indicates no availability at the first office location).

Based on these past occurrences, the automated assistant can further refine an automated assistant procedure to incorporate this decision point and corresponding conditional decisions. For example, when the automated assistant determines that the user has subsequently received an additional reservation request via email, the automated assistant can initialize performance of the "reservation" procedure. Initially, the user can open the additional reservation request email, which can optionally cause the automated assistant to access the office occupancy database for resolving the initial decision point. When the automated assistant determines that the first office location has availability, the automated assistant can resolve the decision point by concluding that the first context is applicable to the current decision point (e.g., there is availability at the first office location). As a result, the automated assistant can identify one or more actions to be executed by the application and/or the automated assistant in order to cause a correspondence to be communicated to the first entity. In response, the first entity can provide an occupancy confirmation, which the automated assistant can access, with prior permission from the user, in order to generate one or more additional actions to be executed in furtherance of the procedure. For example, additional actions can include replying to an originator of the email that initially caused the "reservation" procedure to be executed. The remaining tasks of the "reservation" procedure can then be completed with or without any direct involvement of the user for completing the remaining tasks.

The above description is provided as an overview of some implementations of the present disclosure. Further description of those implementations, and other implementations, are described in more detail below.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein

DETAILED DESCRIPTION

Figure 1A:
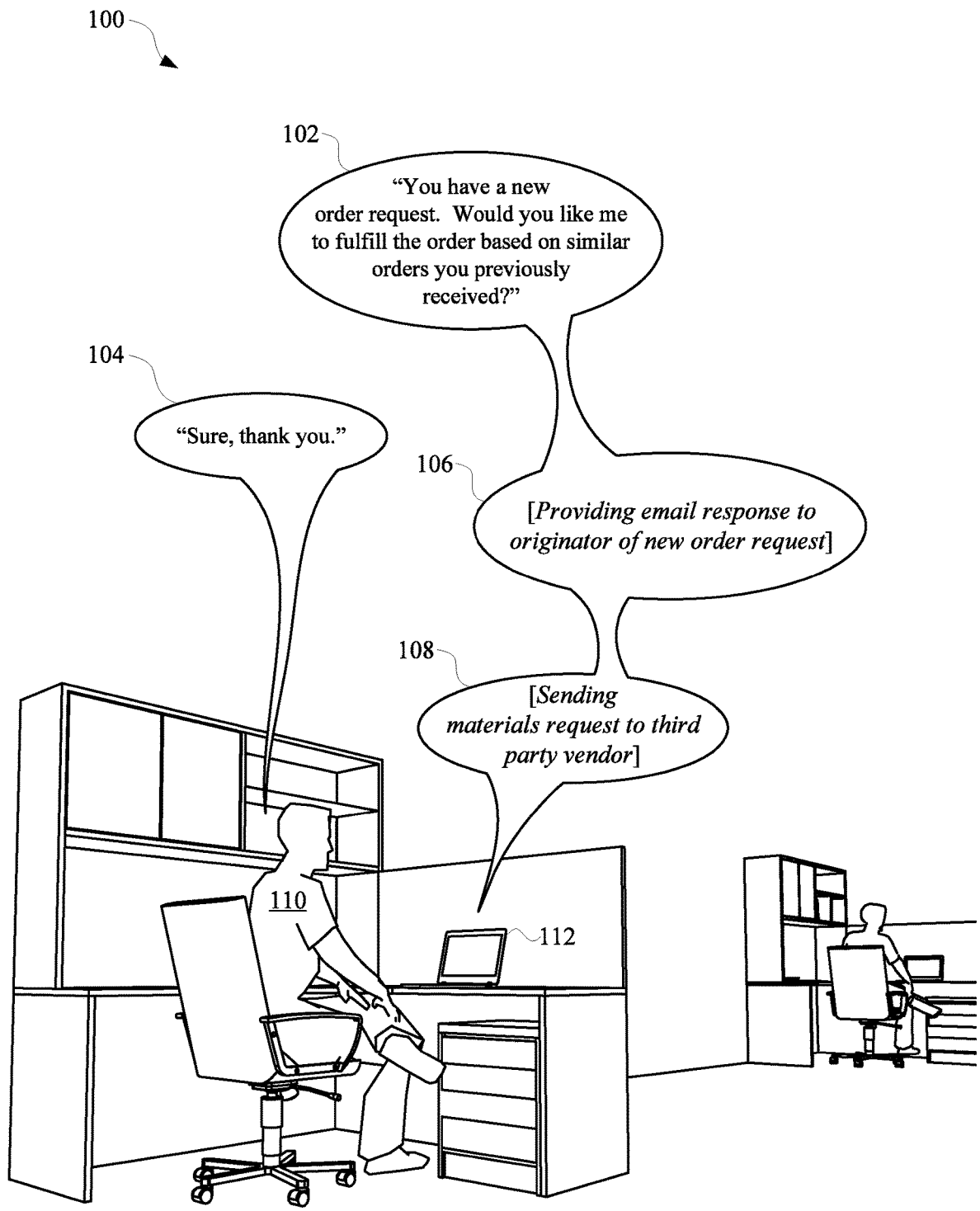
FIG. 1A, FIG. 1B, and FIG. 1C illustrate views of an automated assistant initializing performance of a procedure that involves a variety of applications, users, and/or devices, and that the automated assistant has been trained to perform.
Figure 1B:
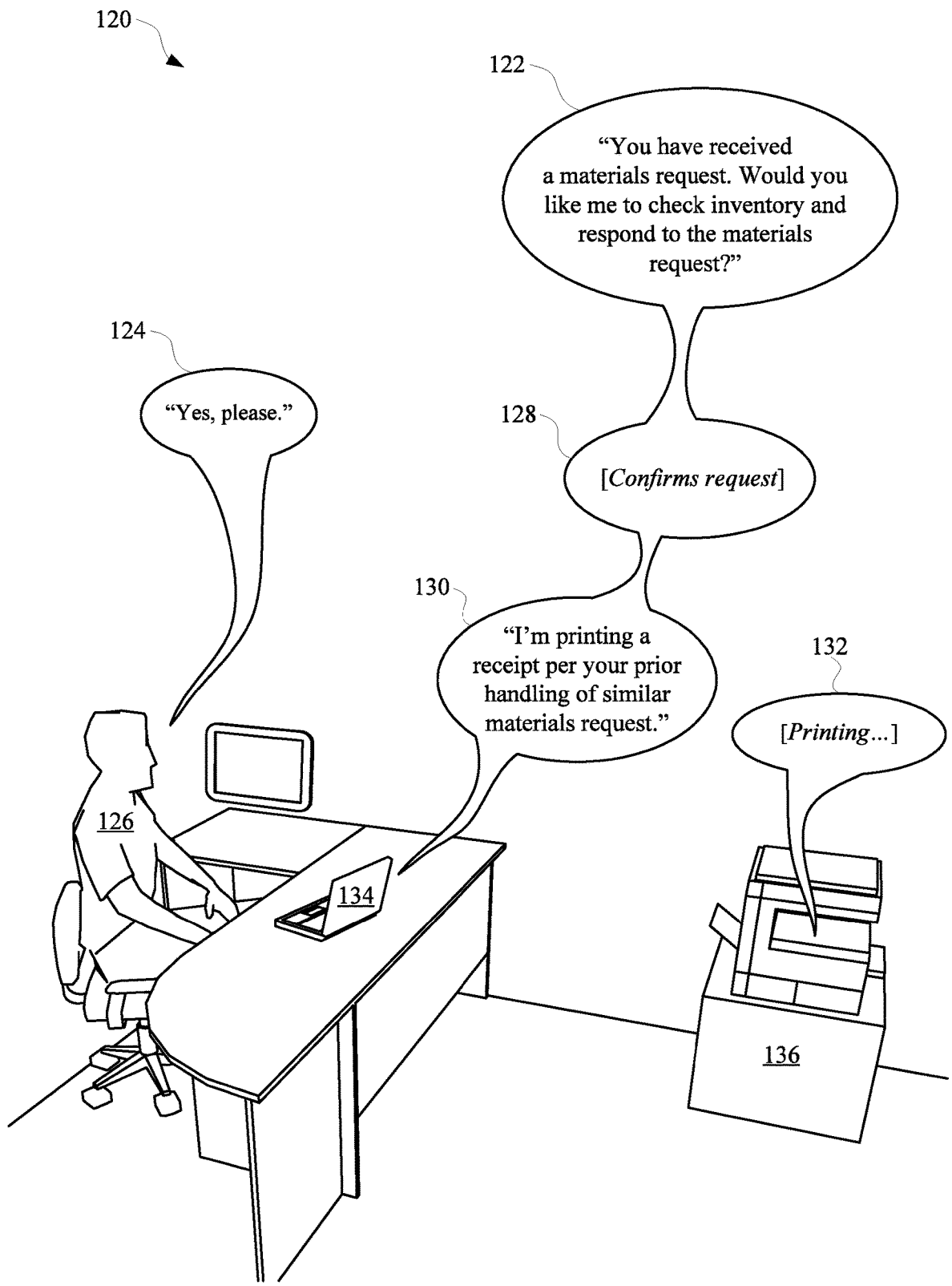
Figure 1C:
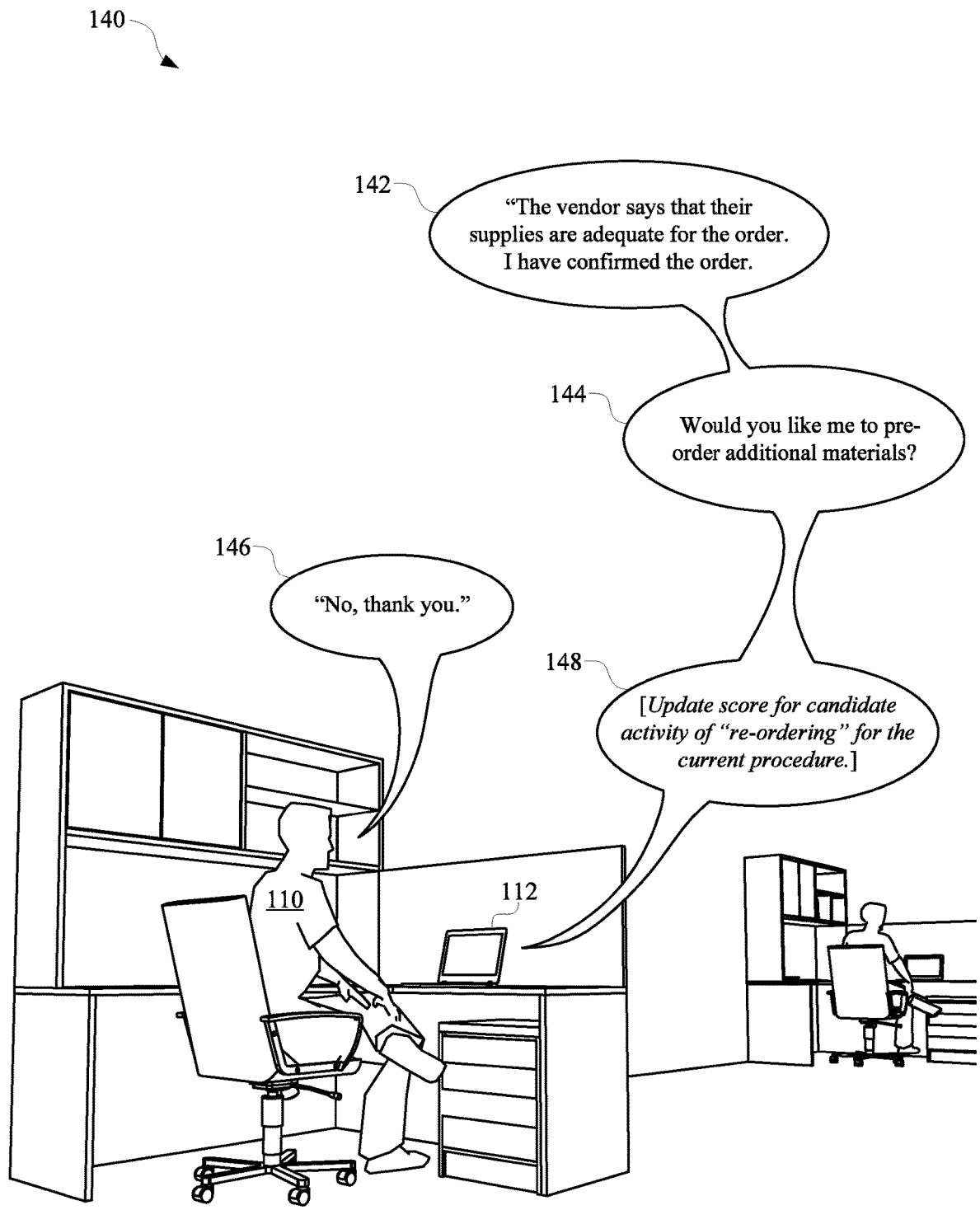

FIG. 1A, FIG. 1B, and FIG. 1C illustrates a view 100, a view 120, and a view 140 of an automated assistant initializing performance of a procedure that involves a variety of applications, users, and/or devices, and that the automated assistant has been trained to perform. In order to initialize performance of a procedure, the automated assistant can process a variety of different data in order to identify an activity that triggers initialization of the procedure. The activity can be, for example, the receipt of an incoming message that includes an order request. Content of the incoming message can be processed, with prior permission from a user 110, in order to identify a correlation between the incoming message and one or more procedures available for the automated assistant to perform. For example, semantic annotations can be generated for various data that can be associated with certain procedures. Furthermore, embeddings can be generated from various annotations and/or sources of data in order to identify a procedure that may correspond to a location in latent space (e.g., when an embedding is a threshold distance from a location in embedding space).

When the automated assistant determines that a particular procedure can be performed in response to a certain activity, such as receiving an order request message, the automated assistant can provide a natural language output 102. The natural language output 102 can be, for example, "You have a new order request. Would you like me to fulfill the order based on similar orders you previously received?" In response, a user 110 can confirm that the automated assistant is permitted to perform the procedure of fulfilling the order request by providing a user input 104 such as, "Sure, thank you." In some implementations, when a particular procedure is determined to not involve sensitive data (e.g., personal financial data, personal messages, information not publicly available, etc.), the automated assistant can bypass requesting that the user 110 permit the automated assistant to perform a procedure.

When the user 110 provides the user input 104, or the automated assistant otherwise initiates performance of the procedure, the automated assistant can, in response, identify one or more actions to perform. For example, based on a semantic understanding of the order request that causes performance of the procedure, the automated assistant can identify one or more actions that have a likelihood of furthering the procedure towards a completed state. For instance, a completed state for the procedure of fulfilling the order can be when the automated assistant has confirmed that the order has been placed. Therefore, based on content of the order request, contextual data, and/or prior instances of performance of the procedure, the automated assistant can select candidate activities that have the highest probability of resulting in completion of the procedure.

For example, when the user 110 has confirmed that the automated assistant is permitted to continue executing the procedure, the automated assistant can select: a candidate activity 106 of providing an email response to an originator of the new order request and another candidate activity 108 of sending materials requests to a third party vendor. In some implementations, execution of these candidate activities can result in no notifications at a computing device 112 that the user 110 is accessing. Alternatively, or additionally, execution of the procedure can result in a notification being rendered at the computing device 112 at the completion of the procedure. In this way, latency caused by notifications to the user 110 can be mitigated in order to streamline completion of the procedure with minimal user distraction.

In some implementations, execution of a candidate activity can vary between different instances of a procedure. For example, multiple prior instances of the user 110 manually fulfilling order requests can involve the user 110 providing an email to an originator of an order request, with or without providing supplemental information. In some implementations, such variations can influence candidate activities identified by the automated assistant. For instance, message-related data, such as an email address of a sender, can be processed in order to identify a suitable template for responding to that particular sender. Therefore—although an initial action of a procedure can include providing a message that includes a confirmation of receipt, other supplemental data can also be incorporated into the message for different instances of the procedure. For example, a template for an email confirmation can be selected with certain types of slots, and/or for certain slot values, when the order request is from a first address. Furthermore, a different template can be selected with other types of slots, and/or for different slot values, when the order request is from a second address that is different from the first address.

When the candidate activity has been executed by the automated assistant, the automated assistant can cause a correspondence to be communicated to an additional automated assistant, which can be accessible via a computing device 134, provided in view 120 of FIG. 1B. When the additional automated assistant receives the correspondence from the automated assistant associated with the user 110, the additional automated assistant can provide a natural language output 122 such as, "You have received a materials request. Would you like me to check the inventory and respond to the materials request?" The natural language output 122 can be generated by the additional automated assistant based on prior instances in which a user 126 acknowledged receipt of a materials request, checked a web application for verifying inventory, and then responded to the materials request. These actions can be characterized by data that is accessible to the additional automated assistant in order for the additional automated assistant to subsequently perform instances of a second procedure that is different from the first procedure initialized in FIG. 1A.

The user 126 can be asked to confirm the inventory check and the response based on the inventory check when the corresponding information is associated with private and/or non-public data. Alternatively, or additionally, the additional automated assistant can request confirmation based on prior instances of the user performing the second procedure and spending additional time reviewing certain data and/or draft messages. These instances can cause the additional automated assistant to assign a threshold score for a particular action that causes the particular action to be subject to user confirmation. The user 126 can provide a confirmation 124 such as, "Yes, please," which can then cause the additional automated assistant to perform an action 128 of confirming the materials request from the automated assistant. In some implementations, such instances of procedure handoffs between automated assistants can result in reduced consumption of computational resources. Such reductions in consumption can be exhibited when users across multiple organizations no longer have to visually review correspondence that is routinely communicated between organizations.

In some implementations, the second procedure can continue to be executed after a "handoff" from the additional automated assistant to the automated assistant has been performed with respect to the first procedure initialized in FIG. 1A. For example, the second procedure can further include a final activity of the additional automated assistant printing a receipt that describes the details of the materials request. In some implementations, the additional automated assistant can cause an IoT device 136 to perform a printing action 132 in order to create a record of the communications between the user 126, the additional automated assistant and, optionally, the automated assistant. Alternatively, or additionally, the additional automated assistant can provide an indication 130 that the receipt is being printed, along with an indication of why certain actions were performed. In this way, by putting the user 126 on notice of the activities of the additional automated assistant during the second procedure, the user 126 can provide feedback in order to influence a weight (i.e., score) of certain activities involved in a procedure. When a particular threshold for an activity of a procedure is not satisfied by the score or weight for an instance of the procedure, the activity can be bypassed for that instance of the procedure.

As an example, when the additional automated assistant confirms the materials request from FIG. 1A, the automated assistant can provide an indication 142 such as, "The vendor says that their supplies were adequate for the order. I have confirmed the order." This can indicate that the automated assistant has received confirmation from the additional automated assistant, and has also sent a message to the originator of the new order request. Furthermore, the automated assistant can determine that a particular candidate activity associated with the first procedure being performed by the automated assistant has a score that does not satisfy a particular threshold but is nonetheless associated with the first procedure. As a result, the automated assistant can provide a query 144 to the user 110 such as, "Would you like me to pre-order additional materials?" In this way, the automated assistant can receive further feedback that can be used to modify the score for further instances of the first procedure.

In some implementations, contextual data associated with performance of an instance of the first procedure can result in a change to the score for the candidate activity (e.g., pre-ordering additional materials). Such contextual data can include other correspondence associated with the user 110, other data accessible to the automated assistant, publicly available data that can affect the first procedure, and/or any other information that can be associated with a context of a procedure. Therefore, when the score for the candidate activity is changed such that the score satisfies a query threshold, the automated assistant can query the user 110 regarding whether the candidate activity should be performed. However, when the score for the candidate activity is changed such that the score does not satisfy the query threshold or an activity threshold, the automated assistant can bypass providing the query 144 to the user 110.

The user 110 can respond to the query 144 with a response 146 such as, "No, thank you," which can be used as feedback by the automated assistant for adjusting the score of the candidate activity for the procedure. For example, based on the response 146, the automated assistant can perform an action 148 of updating a score for the candidate activity of "re-ordering" for the current procedure. Thereafter, during a subsequent instance of the first procedure, the automated assistant may not provide a query 144 for the user 110 regarding pre-ordering materials because of the negative feedback (e.g., response 146) to the query 144.

Figure 2:
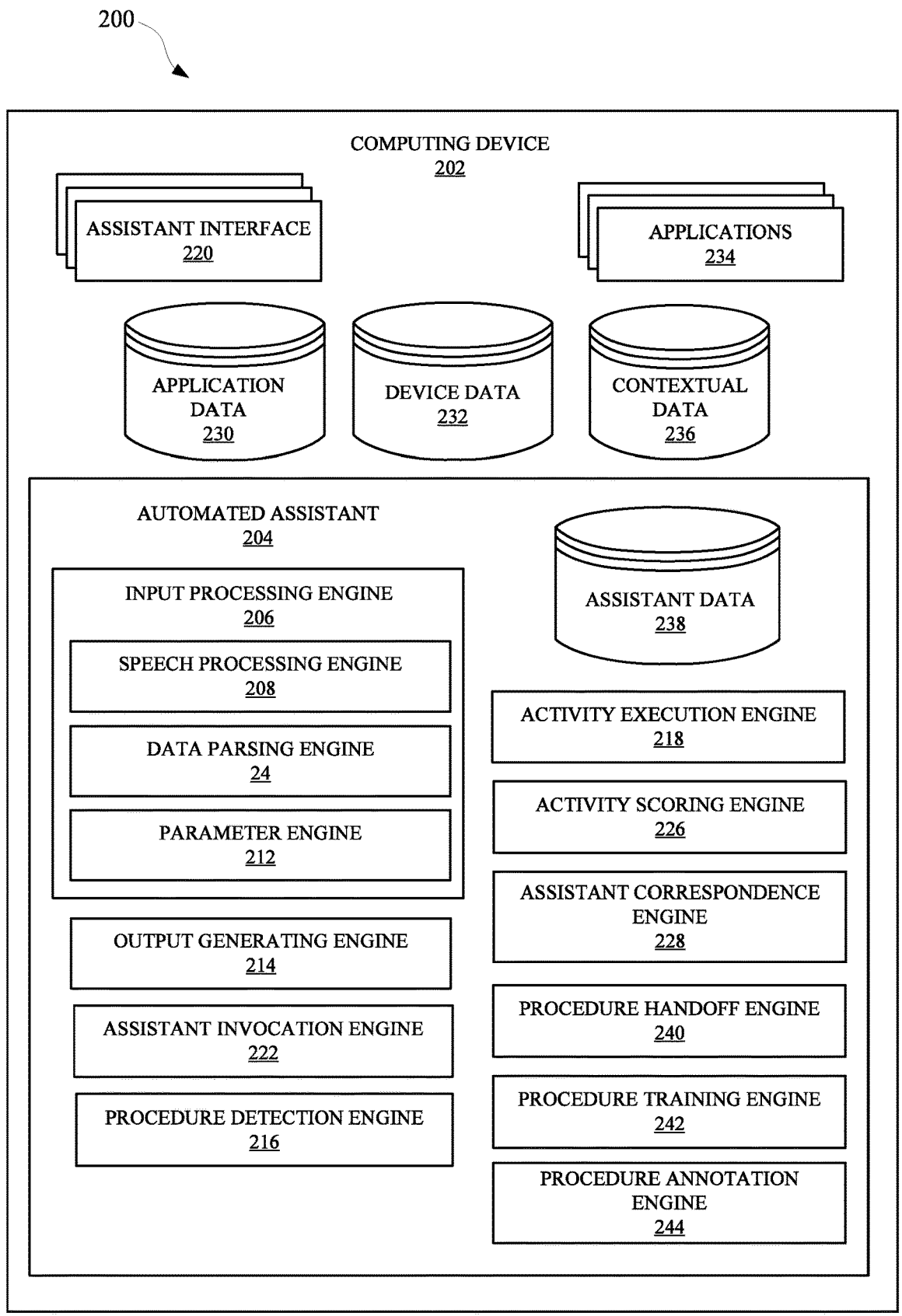
FIG. 2 illustrates a system for providing an automated assistant that can handle procedures performed by one or more persons and/or applications, and can handoff activities to other automated assistants in furtherance of completing such procedures.

FIG. 2 illustrates a system 200 for providing an automated assistant that can handle procedures performed by one or more persons and/or applications, and can handoff activities to other automated assistants in furtherance of completing such procedures. The automated assistant 204 can operate as part of an assistant application that is provided at one or more computing devices, such as a computing device 202 and/or a server device. A user can interact with the automated assistant 204 via assistant interface(s) 220, which can be a microphone, a camera, a touch screen display, a user interface, and/or any other apparatus capable of providing an interface between a user and an application. For instance, a user can initialize the automated assistant 204 by providing a verbal, textual, and/or a graphical input to an assistant interface 220 to cause the automated assistant 204 to initialize one or more actions (e.g., provide data, control a peripheral device, access an agent, generate an input and/or an output, etc.). Alternatively, the automated assistant 204 can be initialized based on processing of contextual data 236 using one or more trained machine learning models. The contextual data 236 can characterize one or more features of an environment in which the automated assistant 204 is accessible, and/or one or more features of a user that is predicted to be intending to interact with the automated assistant 204. The computing device 202 can include a display device, which can be a display panel that includes a touch display interface for receiving touch inputs and/or gesture inputs for allowing a user to control applications 234 of the computing device 202 via the touch interface. In some implementations, the computing device 202 can lack a display device, thereby providing an audible user interface output, without providing a graphical user interface output. Furthermore, the computing device 202 can provide a user interface, such as a microphone, for receiving spoken natural language inputs from a user. In some implementations, the computing device 202 can include a touch interface and can be void of a camera, but can optionally include one or more other sensors.

The computing device 202 and/or other third party client devices can be in communication with a server device over a network, such as the internet. Additionally, the computing device 202 and any other computing devices can be in communication with each other over a local area network (LAN), such as a Wi-Fi network. The computing device 202 can offload computational tasks to the server device in order to conserve computational resources at the computing device 202. For instance, the server device can host the automated assistant 204, and/or computing device 202 can transmit inputs received at one or more assistant interfaces 220 to the server device. However, in some implementations, the automated assistant 204 can be hosted at the computing device 202, and various processes that can be associated with automated assistant operations can be performed at the computing device 202.

In various implementations, all or less than all aspects of the automated assistant 204 can be implemented on the computing device 202. In some of those implementations, aspects of the automated assistant 204 are implemented via the computing device 202 and can interface with a server device, which can implement other aspects of the automated assistant 204. The server device can optionally serve a plurality of users and their associated assistant applications via multiple threads. In implementations where all or less than all aspects of the automated assistant 204 are implemented via computing device 202, the automated assistant 204 can be an application that is separate from an operating system of the computing device 202 (e.g., installed "on top" of the operating system)—or can alternatively be implemented directly by the operating system of the computing device 202 (e.g., considered an application of, but integral with, the operating system).

In some implementations, the automated assistant 204 can include an input processing engine 206, which can employ multiple different modules for processing inputs and/or outputs for the computing device 202 and/or a server device. For instance, the input processing engine 206 can include a speech processing engine 208, which can process audio data received at an assistant interface 220 to identify the text embodied in the audio data. The audio data can be transmitted from, for example, the computing device 202 to the server device in order to preserve computational resources at the computing device 202. Additionally, or alternatively, the audio data can be exclusively processed at the computing device 202.

The process for converting the audio data to text can include a speech recognition algorithm, which can employ neural networks, and/or statistical models for identifying groups of audio data corresponding to words or phrases. The text converted from the audio data can be parsed by a data parsing engine 210 and made available to the automated assistant 204 as textual data that can be used to generate and/or identify command phrase(s), intent(s), action(s), slot value(s), and/or any other content specified by the user. In some implementations, output data provided by the data parsing engine 210 can be provided to a parameter engine 212 to determine whether the user provided an input that corresponds to a particular intent, action, and/or routine capable of being performed by the automated assistant 204 and/or an application or agent that is capable of being accessed via the automated assistant 204. For example, assistant data 238 can be stored at the server device and/or the computing device 202, and can include data that defines one or more actions capable of being performed by the automated assistant 204, as well as parameters necessary to perform the actions. The parameter engine 212 can generate one or more parameters for an intent, action, and/or slot value, and provide the one or more parameters to an output generating engine 214. The output generating engine 214 can use the one or more parameters to communicate with an assistant interface 220 for providing an output to a user, and/or communicate with one or more applications 234 for providing an output to one or more applications 234.

In some implementations, the automated assistant 204 can be an application that can be installed "on-top of" an operating system of the computing device 202 and/or can itself form part of (or the entirety of) the operating system of the computing device 202. The automated assistant application includes, and/or has access to, on-device speech recognition, on-device natural language understanding, and on-device fulfillment. For example, on-device speech recognition can be performed using an on-device speech recognition module that processes audio data (detected by the microphone(s)) using an end-to-end speech recognition machine learning model stored locally at the computing device 202. The on-device speech recognition generates recognized text for a spoken utterance (if any) present in the audio data. Also, for example, on-device natural language understanding (NLU) can be performed using an on-device NLU module that processes recognized text, generated using the on-device speech recognition, and optionally contextual data, to generate NLU data.

NLU data can include intent(s) that correspond to the spoken utterance and optionally parameter(s) (e.g., slot values) for the intent(s). On-device fulfillment can be performed using an on-device fulfillment module that utilizes the NLU data (from the on-device NLU), and optionally other local data, to determine action(s) to take to resolve the intent(s) of the spoken utterance (and optionally the parameter(s) for the intent). This can include determining local and/or remote responses (e.g., answers) to the spoken utterance, interaction(s) with locally installed application(s) to perform based on the spoken utterance, command(s) to transmit to internet-of-things (IoT) device(s) (directly or via corresponding remote system(s)) based on the spoken utterance, and/or other resolution action(s) to perform based on the spoken utterance. The on-device fulfillment can then initiate local and/or remote performance/execution of the determined action(s) to resolve the spoken utterance.

In various implementations, remote speech processing, remote NLU, and/or remote fulfillment can at least selectively be utilized. For example, recognized text can at least selectively be transmitted to remote automated assistant component(s) for remote NLU and/or remote fulfillment. For instance, the recognized text can optionally be transmitted for remote performance in parallel with on-device performance, or responsive to failure of on-device NLU and/or on-device fulfillment. However, on-device speech processing, on-device NLU, on-device fulfillment, and/or on-device execution can be prioritized at least due to the latency reductions they provide when resolving a spoken utterance (due to no client-server roundtrip(s) being needed to resolve the spoken utterance). Further, on-device functionality can be the only functionality that is available in situations with no or limited network connectivity.

In some implementations, the computing device 202 can include one or more applications 234 which can be provided by a third-party entity that is different from an entity that provided the computing device 202 and/or the automated assistant 204. An application state engine of the automated assistant 204 and/or the computing device 202 can access application data 230 to determine one or more actions capable of being performed by one or more applications 234, as well as a state of each application of the one or more applications 234 and/or a state of a respective device that is associated with the computing device 202. A device state engine of the automated assistant 204 and/or the computing device 202 can access device data 232 to determine one or more actions capable of being performed by the computing device 202 and/or one or more devices that are associated with the computing device 202. Furthermore, the application data 230 and/or any other data (e.g., device data 232) can be accessed by the automated assistant 204 to generate contextual data 236, which can characterize a context in which a particular application 234 and/or device is executing, and/or a context in which a particular user is accessing the computing device 202, accessing an application 234, and/or any other device or module.

While one or more applications 234 are executing at the computing device 202, the device data 232 can characterize the current operating state of each application 234 executing at the computing device 202. Furthermore, the application data 230 can characterize one or more features of an executing application 234, such as content of one or more graphical user interfaces being rendered at the direction of one or more applications 234. Alternatively, or additionally, the application data 230 can characterize an action schema, which can be updated by a respective application and/or by the automated assistant 204, based on the current operating status of the respective application. Alternatively, or additionally, one or more action schemas for one or more applications 234 can remain static, but can be accessed by the application state engine in order to determine a suitable action to initialize via the automated assistant 204.

The computing device 202 can further include an assistant invocation engine 222 that can use one or more trained machine learning models to process application data 230, device data 232, contextual data 236, and/or any other data that is accessible to the computing device 202. The assistant invocation engine 222 can process this data in order to determine whether or not to wait for a user to explicitly speak an invocation phrase to invoke the automated assistant 204, or consider the data to be indicative of an intent by the user to invoke the automated assistant—in lieu of requiring the user to explicitly speak the invocation phrase. For example, the one or more trained machine learning models can be trained using instances of training data that are based on scenarios in which the user is in an environment where multiple devices and/or applications are exhibiting various operating states. The instances of training data can be generated in order to capture training data that characterizes contexts in which the user invokes the automated assistant and other contexts in which the user does not invoke the automated assistant. When the one or more trained machine learning models are trained according to these instances of training data, the assistant invocation engine 222 can cause the automated assistant 204 to detect, or limit detecting, spoken invocation phrases from a user based on features of a context and/or an environment. Additionally, or alternatively, the assistant invocation engine 222 can cause the automated assistant 204 to detect, or limit detecting for one or more assistant commands from a user based on features of a context and/or an environment. In some implementations, the assistant invocation engine 222 can be disabled or limited based on the computing device 202 detecting an assistant suppressing output from another computing device. In this way, when the computing device 202 is detecting an assistant suppressing output, the automated assistant 204 will not be invoked based on contextual data 236—which would otherwise cause the automated assistant 204 to be invoked if the assistant suppressing output was not being detected.

In some implementations, the automated assistant 204 can optionally include a procedure detection engine 216. The procedure detection engine 216 can process application data 230, device data 232, contextual data 236, assistant data 238, and/or any other data in order to determine whether activities of one or more users are associated with a repeatedly performed procedure. When such a procedure has been identified, the automated assistant 204 can determine whether to generate further data in order to allow the automated assistant 204 to autonomously perform at least some portions of the procedure. For example, the procedure detection engine 216 can determine whether conducting a procedure without user involvement would result in a reduction in consumption of computational resources. When the automated assistant 204 determines that the procedure should be performed by the automated assistant 204 to reduce wasting of computational resources, the automated assistant 204 can identify various activities that can be involved in completing the procedure.

In some implementations, the system 200 can include a procedure training engine 242 in order for the automated assistant 204 to determine whether certain activities of one or more users, devices, and/or applications are part of a procedure. For example, the procedure training engine 242 can initially identify an initial activity and a final activity that correspond to a beginning and an end of a procedure respectively. Furthermore, the procedure training engine 242 can identify a variety of different activities that occur between the initial activity and the final activity for a particular procedure. Over time, the procedure training engine 242 can further refine the procedure in order to distinctly characterize activities that are part of a procedure or extraneous relative to a procedure. For example, various data can be generated during user activities, such annotations created by a procedure annotation engine 244, in order to provide a semantic understanding of certain activities. Content of the annotations can be processed in order to determine the relevance of certain activities to one or more procedures that have been recognized by the automated assistant 204. When the automated assistant 204 determines that a particular activity (e.g., accessing a movie blog) is unrelated to a particular activity (e.g., editing and sharing photos), the particular activity may not be performed by the automated assistant 204 during subsequent instances of the procedure. Moreover, if the particular activity is detected before, during, and/or after a procedure is being performed by the automated assistant 204, the automated assistant 204 can bypass allowing the particular activity to influence the procedure.

In some implementations, the system 200 can optionally include an activity execution engine 218 for identifying and initializing actions that are associated with a procedure. The activity execution engine 218 can also identify one or more parameters for one or more slot values of a particular action. For example, although one or more actions for a procedure can remain static for various instances of the procedure, certain parameters and/or slot values of an action can be dynamic. For instance, an activity of the automated assistant 204 sending a reply message on behalf of a user can be an activity that is part of a procedure, but the content of the reply message can vary according to a variety of different factors. In some implementations, a context (e.g., a location of the user) of a performance of a procedure can be a basis from which the automated assistant can select certain parameters for an action that is part of a procedure.

In some implementations, the system 200 can include an activity scoring engine 226 that can determine a score for each activity of a procedure and/or any other activities that are occurring during performance of a procedure. In this way, when a score of a particular activity satisfies a threshold or fails to satisfy the threshold, the automated assistant 204 can accordingly modify a procedure that includes the particular activity. In some implementations, data characterizing an activity can be processed to generate an embedding, which can be compared to other embeddings in latent space to determine a score and/or a relevance of an activity to a procedure.

In some implementations, an activity can be associated with multiple scores, and each score can correspond to a different procedure. In this way, as the automated assistant 204 performs various procedures and receives feedback regarding a particular activity, scores for the particular activity can be adjusted such that a threshold for a first procedure may be satisfied by a first score of an activity, but another threshold for a second procedure may not be satisfied by a second score of the particular activity. As a result, the first procedure may continue to incorporate the particular activity, but the second procedure may no longer incorporate the particular activity.

In some implementations, the system 200 can include an assistant correspondence engine 228, which can assist the automated assistant 204 with communicating with other automated assistants. For example, the assistant correspondence engine 228 can employ multiple different APIs in order to communicate with other automated assistants that may be provided by a different entity than the automated assistant 204. Furthermore, the assistant correspondence engine 228 can generate data for characterizing a state of a procedure that the automated assistant 204 is assisting with. When the procedure involves another automated assistant, the automated assistant can employ the assistant correspondence engine 228 in order to communicate the state of the procedure and/or receive state data about a different procedure being performed at a different automated assistant.

Figure 3:
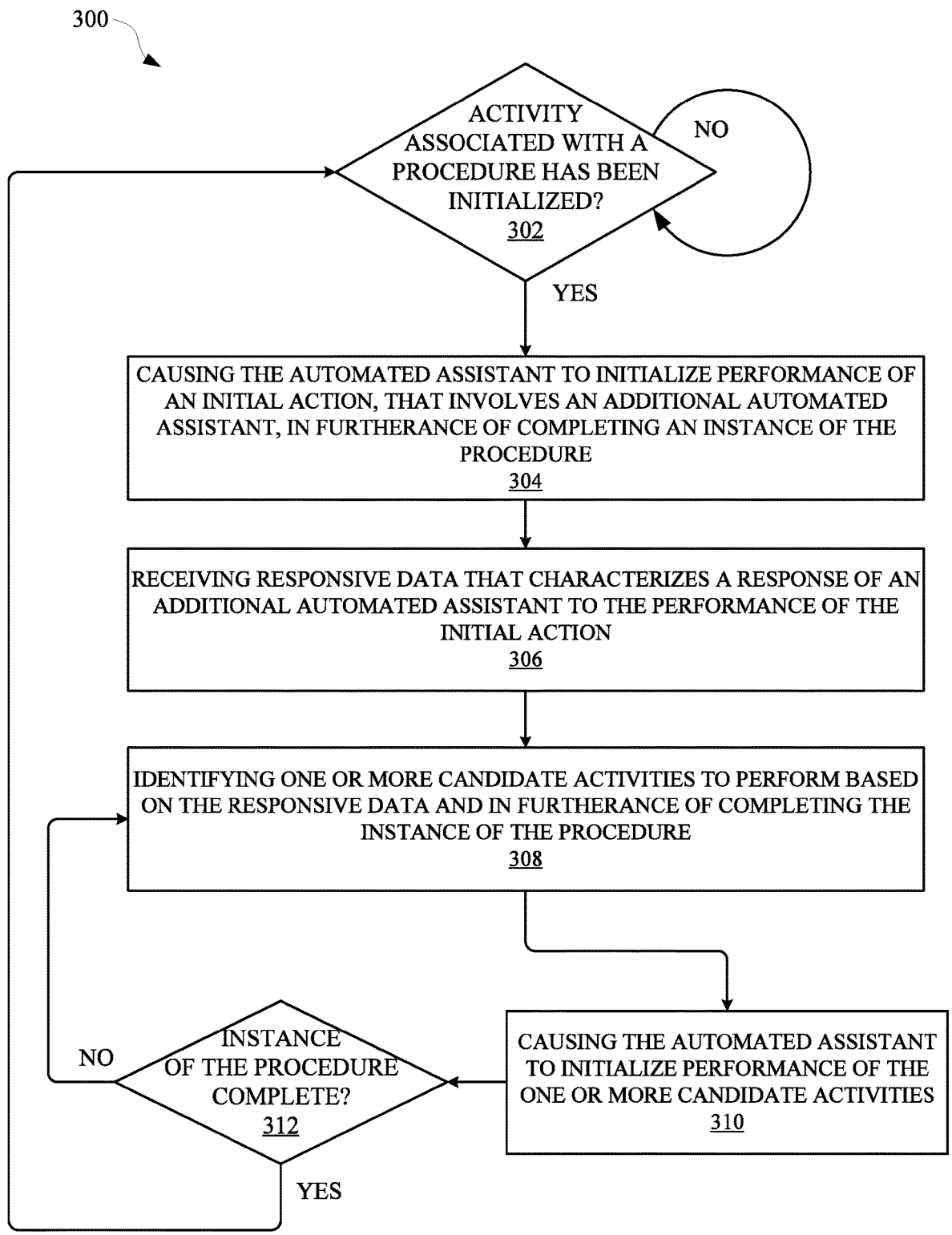
FIG. 3 illustrates a method for causing an automated assistant to perform a procedure that includes one or more interactions between the automated assistant and an additional automated assistant, and is learned from prior activities of one or more users.

FIG. 3 illustrates a method 300 for causing an automated assistant to perform a procedure that includes one or more interactions between the automated assistant and an additional automated assistant, and is learned from prior activities of one or more users. The method 300 can be performed by one or more applications, computing devices, and/or any other apparatus or module capable of providing access to an automated assistant. The method 300 can include an operation 302 of determining whether an activity associated with a procedure has been initialized. The procedure can be a series of tasks that one or more users have routinely performed in the past, but can be learned by an automated assistant that is accessible to the one or more users. In some implementations, a procedure can involve various tasks performed by different users, and each user can train their own respective automated assistant to autonomously complete their respective task(s).

For example, a procedure that involves multiple users and/or multiple instances of an automated assistant can be when a first user (e.g., support staff of an organization) checks their incoming messages to see if any participants in a service have any questions about the service. When the first user identifies a particular message that is inquiring about a final date of availability of the service, the first user can contact a second user (e.g., service manager) in order to confirm the final date of the service, which can be a dynamic variable. This second user can check an intranet site of an organization in order to verify the final date of the service and then respond to the first user with the verification. The first user can then respond to the particular message with a confirmation and/or modification to the final date of the service, in accordance with the response from the second user. This process involving the first user and the second user can be analyzed by the automated assistant(s) in order to generate data characterizing a procedure that can be initialized by the automated assistant under certain circumstances. Furthermore, the first user and the second user can train their own respective automated assistants to adequately handle their respective task(s) in the procedure.

When an activity associated with a procedure has been initialized and/or otherwise performed, the method 300 can proceed from the operation 302 to an operation 304. Otherwise the automated assistant can continue to determine whether an activity associated with one or more procedures has been initialized. In some implementations, an activity can be initialized when an application that is separate from the automated assistant indicates that certain data, such as a particular type of message, is available. When, for example, a messaging application receives a message with content that includes, or is synonymous with, the term "final date," the automated assistant can determine that an activity associated with the aforementioned procedure has been initialized.

The operation 304 can include causing the automated assistant to initialize performance of an initial action, which involves an additional automated assistant, in furtherance of completing the instance of the procedure. For example, the activity associated with the procedure is associated with some amount of initial data, the automated assistant can use the initial data to generate a correspondence that can be provided to an additional automated assistant. For instance, and per the aforementioned scenario, the automated assistant associated with the first user can generate a correspondence based on the messaging application receiving the particular message. The correspondence and/or a procedure state can then be provided to the additional automated assistant associated with the second user in order for the additional automated assistant to confirm the "final date" for the service, as requested in the particular message.

In some implementations, the additional automated assistant can be trained expressly or implicitly by actions performed by the second user in response to receiving certain messages from the first user. For example, the second user can direct the additional automated assistant to respond to certain types of messages using information from a separate application (e.g., an intranet website). For instance, the second user can provide, to the additional automated assistant, a spoken utterance such "Assistant, when I receive a message regarding confirming a 'final date' of a service, retrieve the 'final date' entry from the intranet site, and reply to the message with the 'final date' entry value." Alternatively, or additionally, the second user can provide the automated assistant with permission to process repetitive actions of the second user in order that the automated assistant can process the repetitive actions to determine whether the automated assistant can save the user time and/or resources during performance of those actions. When the additional automated assistant determines that an action can be handled by the additional automated assistant, the additional automated assistant can provide a notification to the second user that the additional automated assistant will take over performing the action.

The method 300 can proceed from the operation 304 to an operation 306, which can include receiving responsive data that characterizes a response of the additional automated assistant to the performance of the initial action. For example, in response to receiving a correspondence from the automated assistant associated with the first user, the additional automated assistant can provide responsive data, which can be embodied in another correspondence. The responsive data can include information that the second user would otherwise provide in an additional message to the first user, when the first user provides the initial message to the second user. For example, instead of the second user accessing their respective messaging application to respond to the message from the first user, the additional automated assistant can generate an application programming interface (API) command for interfacing with the automated assistant. The API command can embody the responsive data that is communicated to the automated assistant and can confirm, for example, the "final date" of the service, as set forth in the intranet site.

The method 300 can proceed from the operation 306 to an operation 308, which can include identifying one or more candidate activities to perform based on the responsive data and in furtherance of completing the instance of the procedure. In some implementations, depending on the responsive data and/or updated procedure state received from the additional automated assistant, the automated assistant can identify one or more candidate activities to initialize in furtherance of completing the procedure or another procedure per operation 310. For example, and in accordance with the aforementioned scenario, the additional automated assistant can confirm a "final date" that was initially identified in the particular message received by the first user. Based on this confirmation, the automated assistant can identify a candidate activity such as responding to the particular message with a confirmation message such as, "Thank you for your message. We confirm that [date identified in the particular message] is the final date for the service."

Alternatively, when the responsive data corresponds to a different candidate activity, the automated assistant can initialize performance of the other candidate activity per an operation 310. For example, the responsive data and/or other activity data can be compared to automated assistant data in order to determine a procedure that exhibits a threshold similarity to the responsive data and/or the other activity data. When another procedure is identified as having a threshold similarity to the responsive data and/or the other activity data (e.g., data characterizing other activities that the first user may be involved with), the automated assistant can elect to pause and/or bypass continuing the procedure that is in progress and, instead, perform the other procedure.

For example, when the responsive data does not confirm the "final date" from the particular message, another procedure can exist for handling non-confirmations. Therefore, a candidate activity, such as generating a non-confirmation message, can be selected from the other procedure. In such an instance, the operation 310 can include causing the automated assistant to initialize performance of the selected candidate activity. In accordance with the aforementioned example, the automated assistant can reply to the particular message with a confirmation message or a non-confirmation message. Thereafter, and/or simultaneous to the operation 308, the method 300 can proceed to an operation 312 of determining whether the instance of the procedure is completed. When the instance of the procedure is completed, the method 300 can return to the operation 302. Otherwise, the method 300 can return to the operation 308 for identifying another candidate activity to initialize in order to further an instance of a procedure toward completion.

In some implementations, a procedure can include providing a report of interactions between the automated assistant and the additional automated assistant. The report can allow the first user and/or the second user to review the correspondence that occurred between the automated assistant and the additional automated assistant. Alternatively, or additionally, when the first user and/or the second user expressly confirm data and/or an activity during the procedure, the automated assistant can cause the report to include an indication of the data and/or activity that was expressly confirmed. For example, the additional automated assistant can ask the second user to confirm that the "final date" value is correct (e.g., "Is August 21 the correct final date for the service?"), and the second user can confirm with a user input (e.g., "Yes, that date is correct."). Based on this express confirmation from the second user, the automated assistant can provide an indication in the report (e.g., render the "final date" in bold letters) that the second user confirmed the data and/or activity.

Figure 4:
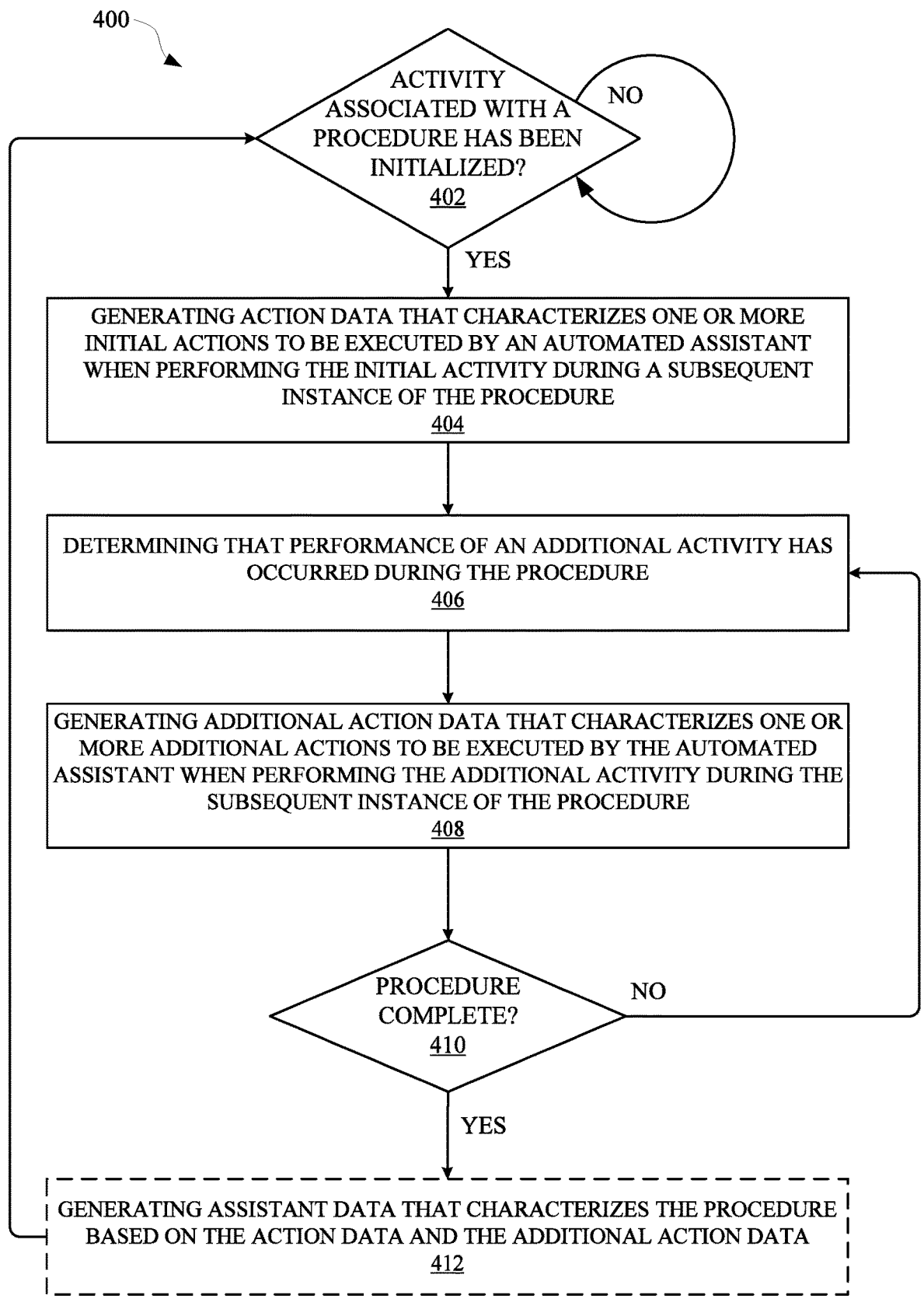
FIG. 4 illustrates a method for providing an automated assistant that can be trained to perform one or more procedures that involve one or more users and/or various activities.

FIG. 4 illustrates a method 400 for providing an automated assistant that can be trained to perform one or more procedures that involve one or more users and/or various activities. The method 400 can be performed by one or more applications, computing devices, and/or any other apparatus or module capable of providing access to an automated assistant. The method 400 can include an operation 402 of determining whether an activity associated with a procedure has been initialized. The procedure can be a series of tasks, as discussed herein, and can involve various tasks performed by different users. In some implementations, in order to establish a particular procedure that can be exclusively performed by the direction of an automated assistant, the automated assistant can be trained by one or more users implicitly and/or expressly. For example, and with prior permission from each user, the automated assistant can use one or more trained machine learning models in order to classify application activity that may be occurring in association with a procedure. Such activity can include opening applications, closing applications, selecting one or more GUI elements, providing inputs to a field, providing an input to an interface of a computing device, extracting information from a screen, listening to audio, examining video, and/or any other action that can be performed at and/or by a computing device.

When an activity occurs that may be associated with a procedure, the method 400 can include an operation 404 that includes generating action data that characterizes one or more initial actions to be executed by an automated assistant when performing the initial activity during a subsequent instance of the procedure. The initial actions can correspond to an activity that may be indicative of an initial start to a procedure that a user may have performed frequently in the past. For example, and based on processing activity data, the automated assistant can determine that a particular procedure is typically initialized when a particular report is generated by an application that is available at a computing device associated with a user. Furthermore, the automated assistant can determine that the user sends information from the report to another user on a periodic basis. Based on such occurrences, the automated assistant can generate the action data to characterize one or more commands that, when executed, cause the automated assistant to detect when the report is generated and forward report information to the other user.

The method 400 can further include an operation 406 that involves determining, subsequent to the user initializing performance of the initial activity, that the user has initialized performance of an additional activity in the procedure. The additional activity can be performed by the user or another user at the computing device or another computing device that provides access to the automated assistant. In some implementations, a trained machine learning model can be used to process activity data in order to determine similarity of the additional activity to the activity detected at the operation 402. When the activity and the additional activity satisfy a similarity threshold, the activity and the additional activity can be determined to be part of the same procedure. For example, a trained machine learning model can be used to generate an embedding, or sequence of embeddings, in latent space for the activity, and a separate embedding in latent space for the additional activity. When a distance in latent space between each embedding satisfies a similarity threshold, the activity and the additional activity can be considered part of the same procedure. However, when the distance in latent space between each embedding does not satisfy the similarity threshold, the additional activity can be considered an extraneous activity relative to the procedure that the activity corresponds to. As a result, the automated assistant may not generate any action data for the additional activity when the additional activity does not satisfy a similarity threshold for the activity and/or the procedure.

The method 400 can further include an operation 408 that involves generating additional action data that characterizes one or more additional actions to be executed by the automated assistant when performing the additional activity during the subsequent instance of the procedure. In some implementations, the additional action data can characterize one or more commands that, when executed, cause the automated assistant to perform the additional activity identified at the operation 406. For example, the additional action data can characterize one or more actions of forwarding certain report information to another user. The method 400 can further include an operation 410 of determining whether the procedure is complete. When the procedure is determined to be complete, the method 400 can proceed to an operation 412. Otherwise, the method 400 can return to the operation 406 when the operation is determined to not be complete and/or one or more other actions should be performed in order to complete the procedure.

The operation 412 can optionally include generating assistant data that characterizes the procedure based on the action data and the additional action data. In some implementations, the assistant data, the action data, and/or the additional action data can be stored as a semantic understanding of a procedure, a class of data characterizing the procedure, an embedding that represents the procedure, and/or any other type of information that can be stored in association with a procedure. The assistant data can then be processed to determine whether a user is subsequently engaged in activity that is being performed in furtherance of completing the procedure.

Alternatively, or additionally, the automated assistant can determine when a user is participating in another activity that seeks to modify a procedure that is characterized by the assistant data. For example, the automated assistant can use a trained machine learning model to determine that a particular activity (e.g., modifying certain information in the report) is relevant to an existing procedure, and then determine whether to modify the particular procedure to incorporate the particular activity. When the automated assistant determines to modify the particular procedure, the assistant data can be updated in order to identify one or more additional actions (e.g., prompt the user regarding how to modify the report and then modify the report according to how the user responds to the automated assistant) to be performed by the automated assistant in order to complete the particular procedure.

Figure 5:
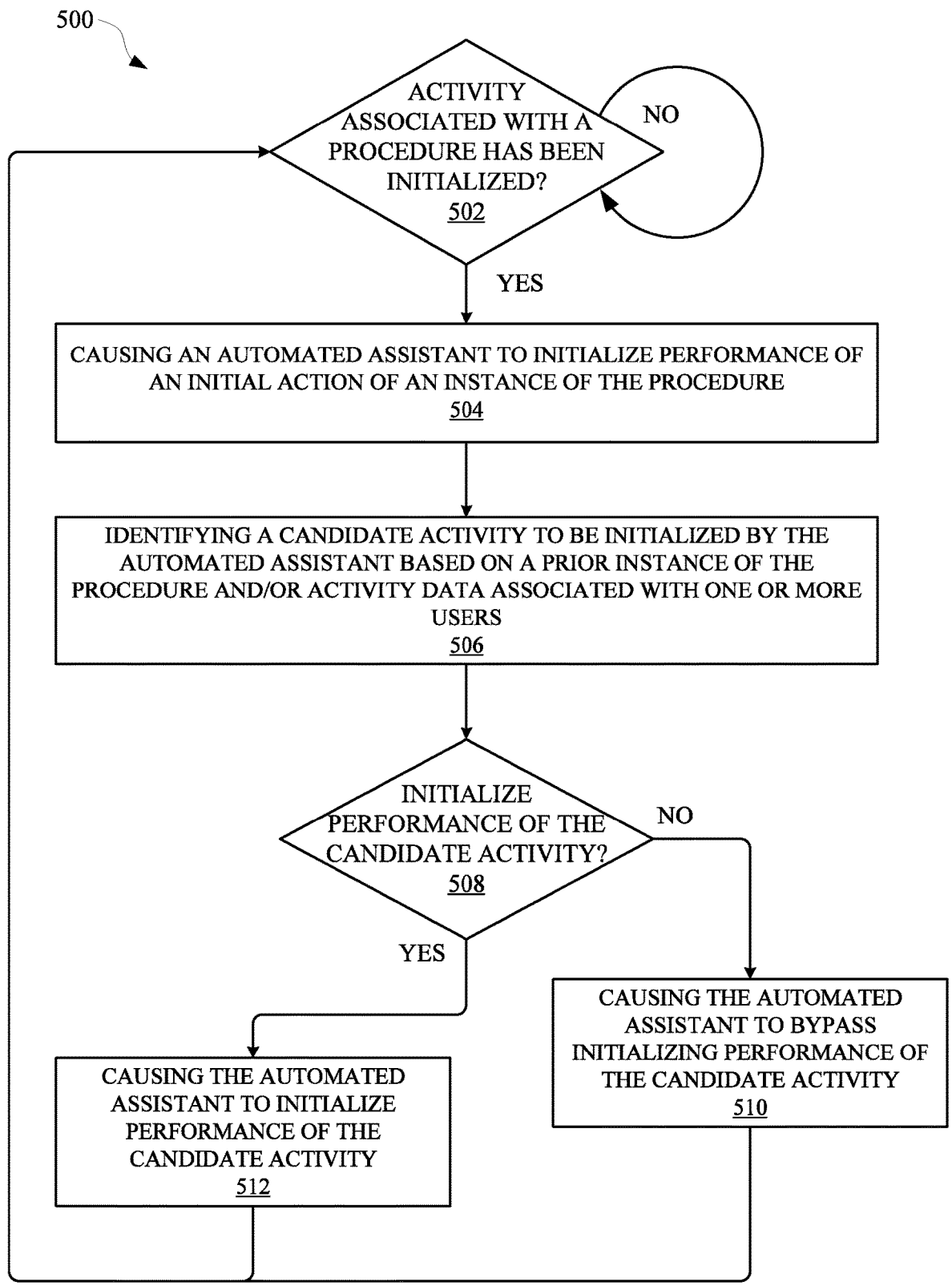
FIG. 5 illustrates a method for causing an automated assistant to initialize performance of a procedure that the automated assistant has been trained to perform.

FIG. 5 illustrates a method 500 for causing an automated assistant to initialize performance of a procedure that the automated assistant has been trained to conduct. The method 500 can be performed by one or more applications, computing devices, and/or any other apparatus or module capable of providing access to an automated assistant. The method 500 can include an operation 502 of determining whether an activity associated with a procedure has been initialized. The procedure can be a series of tasks, as discussed herein, and can involve various tasks being performed by various different applications. In some implementations, the procedure can involve one or more decision points, which can be identified based on data that can be available before and/or during performance of the procedure. When the automated assistant determines that an activity associated with a procedure has been initialized, the method 500 can proceed from operation 502 to operation 504. Otherwise, the automated assistant can continue to determine whether an activity associated with a procedure has been initialized.

The operation 504 can include causing the automated assistant to initialize performance of an initial action of an instance of the procedure. For example, the activity can include a user arriving at a particular location in their vehicle, which can provide access to the automated assistant. Additionally, the automated assistant can initialize performance of an initial action in response to determining that this activity is occurring. For example, based on prior instances of a first user performing this particular procedure, the automated assistant can generate a message on behalf of the first user and communicate the message to a second user. This message can be inquiring whether the second user received any phone calls about an organization that the first user and the second user are a part of. Although this can be performed by the user via their portable electronic device and/or from their vehicle, the automated assistant can automate this process. In this way, the automated assistant can subsequently trigger the process based on certain contextual features (e.g., the first user arriving to their work address in their vehicle) correlated to prior instances of the first user performing the process.

The method 500 can further include an operation 506 that involves identifying a candidate activity to be initialized by the automated assistant based on a prior instance of the procedure and/or activity data associated with one or more users. For example, the candidate activity can be identified based on one or more prior instances in which the first user performed the procedure, and/or one or more other users performed the procedure. Based on past occurrences of the procedure, the automated assistant can determine a candidate activity that is most relative to the current performance of the procedure. A degree of similarity between the current performance of the procedure and one or more prior performances of the procedure can be generated to identify a particular candidate activity that has the highest degree of similarity.

In some implementations, other activity data can be considered when determining whether to execute the identified candidate activity. For example, in the aforementioned scenario, when the automated assistant causes the initial action to be performed, responsive data can be provided to the automated assistant as a result. The responsive data can indicate that the first user did not receive any phone calls related to the organization. In some prior instances of the procedure, the first user may have received, from the second user, an indication that the first user did not receive any related phone calls, and then the first user may have replied to the second user with a follow up message. The follow up message may have included content that requested the second user to provide an indication of when the second user is available for a meeting. Alternatively, in prior instances when the first user received a message from the second user indicating that one or more phone calls were received, the first user can provide a message to the second user asking to generate a report that identifies the phone calls and their purpose.

The method 500 can further include an operation 508 that involves determining, by the automated assistant, whether to initialize performance of the candidate activity. In some implementations, the automated assistant can bypass performance of a candidate activity until certain contextual features of the current performance of the procedure have become apparent. In some implementations, in order to determine whether or not to perform the candidate activity, the automated assistant can employ a sequence model, a recurrent neural network, and/or any other neural network or model that is suitable for selecting an action to perform. Alternatively, or additionally, the selected model can be trained from prior instances and/or variations in the procedure. Other features of a context of this decision point can influence whether or not the candidate activity is performed, and data characterizing these features can also be processed using a trained machine learning model. For example, a time that a user arrives at work, along with whether the second user indicates a phone call is received, can be processed in order to determine whether or not to conduct the candidate activity of requesting that the second user generate a report or setup a meeting.

The method 500 can further include an operation 508 of choosing whether to perform the candidate activity based on processing discussed herein. When the automated assistant determines to initialize performance of the candidate activity, the method 500 can proceed to an operation 512 of causing the automated assistant to initialize performance of the candidate activity. Otherwise, the method 500 can proceed to an operation 510 of causing the automated assistant to bypass initializing performance of the candidate activity. In some implementations, based on processing of activity data and/or contextual data, the automated assistant can pause performance of the candidate activity until one or more features of the context changes, and/or an activity of one or more users and/or applications changes. Thereafter, the method 500 can return to the operation 502.

Figure 6:
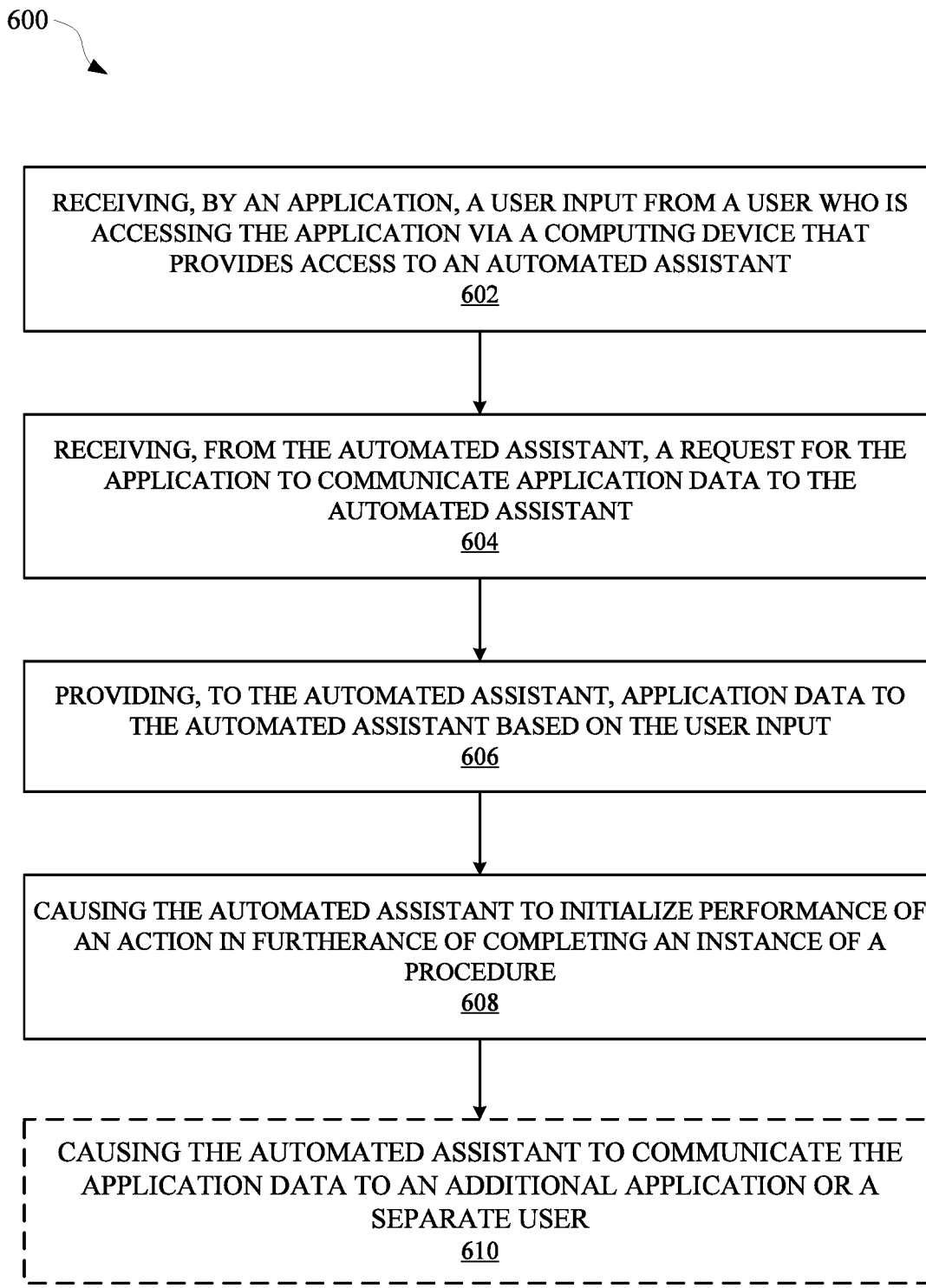
FIG. 6 illustrates a method for allowing an application to assist an automated assistant with completing a procedure that one or more users had previously employed the application to perform.

FIG. 6 illustrates a method 600 for allowing an application to assist an automated assistant with completing a procedure that one or more users had previously employed the application to perform. The method 600 can be performed by one or more applications, computing devices, and/or any other apparatus or module capable of providing access to an automated assistant. The method 600 can include an operation 602 that involves receiving, by an application, a user input from a user who is accessing the application via a computing device that provides access to an automated assistant. The user input can be provided directly to an interface of the application in furtherance of the user completing an instance of a procedure. Alternatively, or additionally, the user input can be implicitly implied from an interaction between one or more users and a computing device that is associated with the application. That user input can indicate to the automated assistant that a particular procedure should be initialized by the automated assistant.

The method 600 can further include an operation 604 that involves receiving, from the automated assistant, a request for the application to communicate application data to the automated assistant. In some implementations, the request can be provided by the automated assistant in response to the automated assistant determining that the user is accessing the application in furtherance of completing the instance of the procedure. For example, the application can be a browser application, a messaging application, a document editing application, an IoT application, and/or any other application that can be accessed via a computing device.

The method 600 can further include an operation 606 that involves providing, to the automated assistant and based on the user input, application data to the automated assistant. In some implementations, the application data is accessed by the application in response to the user input from the user. Therefore, based on the request from the automated assistant and the user input, the application can make the application data accessible to the automated assistant. For example, in some implementations, the request from the automated assistant can be provided as an API request, and the data provided back to the automated assistant can also be provided as an API command. Alternatively, or additionally, the application can provide temporary access to the automated assistant based on the request and/or other permission provided by the automated assistant.

The method 600 can further include an operation 608 that involves causing, based on the automated assistant receiving the application data, the automated assistant to initialize performance of an action in furtherance of completing the instance of the procedure. In some implementations, when the application is a web application, the automated assistant can process GUI data in order to identify how the automated assistant can interact with the web application in order to complete the procedure. For example, data characterizing one or more screenshots, web application inputs, and/or other information associated with interactions between the user and the web application can be processed using one or more trained machine learning models. Based on this processing, the automated assistant can identify one or more actions to perform in order to effectuate performance of a procedure that has been completed using the application, as discussed herein.

In some implementations, the method 600 can include an optional operation of causing the automated assistant to communicate the application data to an additional application and/or a separate user. For instance, the automated assistant can receive the application data from the application and, in furtherance of completing the procedure, provide another application and/or a separate user with access to the application data. In some implementations, the automated assistant can provide an additional automated assistant with access to the application data and/or a derivative of the application data. In this way, the separate user does not necessarily need to access the application data and/or view the application data, but, rather, can rely on the additional automated assistant to handle any requests that may be coming through from the automated assistant associated with the procedure being performed.

Figure 7:
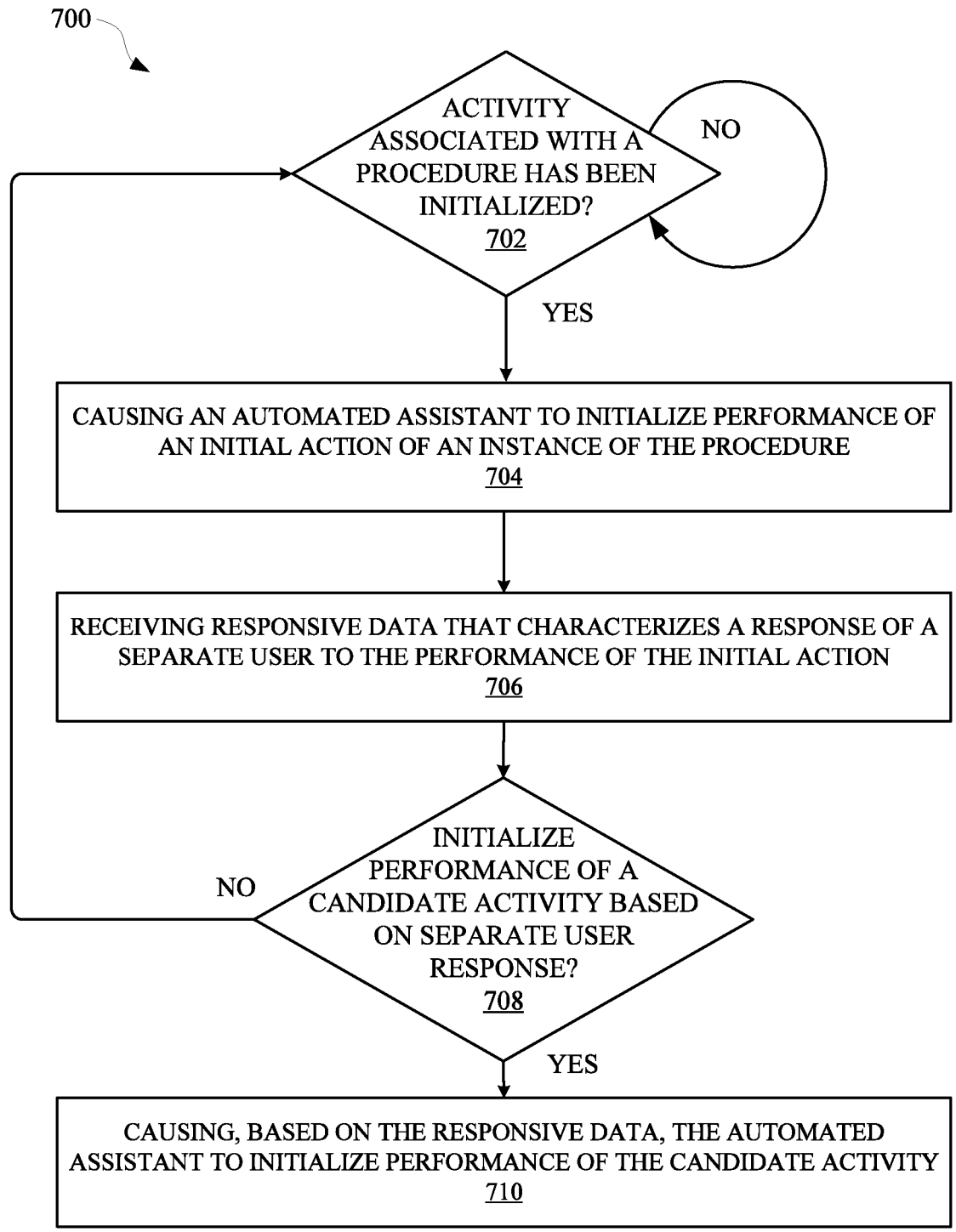
FIG. 7 illustrates a method for causing an automated assistant to perform a particular procedure that involves communication with a separate user in order to complete the particular procedure.

FIG. 7 illustrates a method 700 for causing an automated assistant to perform a particular procedure that involves communication with a separate user in order to complete the particular procedure. The method 700 can be performed by one or more applications, computing devices, and/or any other apparatus or module capable of providing access to an automated assistant. The method 700 can include an operation 702 of determining whether an activity associated with a procedure has been initialized. The procedure can be a series of tasks, as discussed herein, and can involve various tasks performed by different users. For example, the procedure can include actions that involve determining whether a particular product is available from a third party individual. When an activity associated with a procedure is determined to have been initialized, the method 700 can proceed to an operation 704. Otherwise, the automated assistant can continue to determine whether any activity associated with a procedure has been initialized.

The operation 704 can include causing, based on the user engaging in the activity associated with the procedure, the automated assistant to initialize performance of an initial action of an instance of the procedure. In some implementations, an initial action of a procedure can include causing initial data to be provided to a separate user. The initial data can correspond to a correspondence from the user to a separate user in order to request availability of a product that the separate user provides or stores. The procedure can be learned by the automated assistant during prior instances in which the user provided synonymous requests to the separate user each week. When the automated assistant detects multiple instances of the procedure, the automated assistant can determine that, by automatically performing the procedure without the user being directly involved at every step, the automated assistant can preserve various resources for the user and/or any devices involved.

The method 700 can further include an operation 706 that involves receiving, by the automated assistant, responsive data that characterizes a response of the separate user to receiving the initial data. In some instances, the separate user can provide a first indication that causes the automated assistant to perform a first action and/or a second indication that causes the automated assistant to perform a second action. In some implementations, a trained machine learning model can be trained based on prior instances in which the separate user provided a variety of different feedback to the initial action (e.g., or a similar action) performed by the user in prior instances.

The method 700 can further include an operation 708 of determining whether to initialize performance of a candidate activity based on a response of the separate user. For example, in some implementations, a neural network can be employed to process responsive data from the separate user and/or a separate application associated with the separate user. Therefore, a candidate activity can be selected from a variety of different candidate activities based on processing of the responsive data using the neural network. In some implementations, when the procedure is related to availability of a product, and the responsive data indicates that the product is not available, the automated assistant can bypass performing any candidate activity and return to the operation 702. However, when processing the responsive data returns an indication that the candidate activity should be performed, the method 700 can proceed to an operation 710.

The operation 710 can include causing, based on the responsive data and/or contextual data, the automated assistant to initialize performance of the candidate activity. In some instances, when the procedure is related to product availability and the responsive data is an indication from the separate user that the product is available, the automated assistant can perform the candidate activity. In such instances, the candidate activity can be, for example, communicating with another instance of the automated assistant that is accessible via a separate device. Alternatively, or additionally, the candidate activity can be, for example, causing the automated assistant to generate a request for the product to be ordered from the separate user. In some implementations, the procedure can be paused upon completion of the candidate activity and can resume when certain contextual data is available. For example, subsequent to completion of the candidate activity, the automated assistant can determine whether certain contextual data is available to trigger initialization of the next, or the final, activity for completing the procedure. The contextual data can include, for example, a communication from a third party entity being received by the user and indicating that the product has arrived. In response to this communication, the automated assistant can consider the procedure to be completed and can determine when to re-initialize performance of the procedure from the beginning (e.g., when the user starts to draft a message for contacting the separate user and the draft message contains content associated with the term "inventory").

Figure 8A:
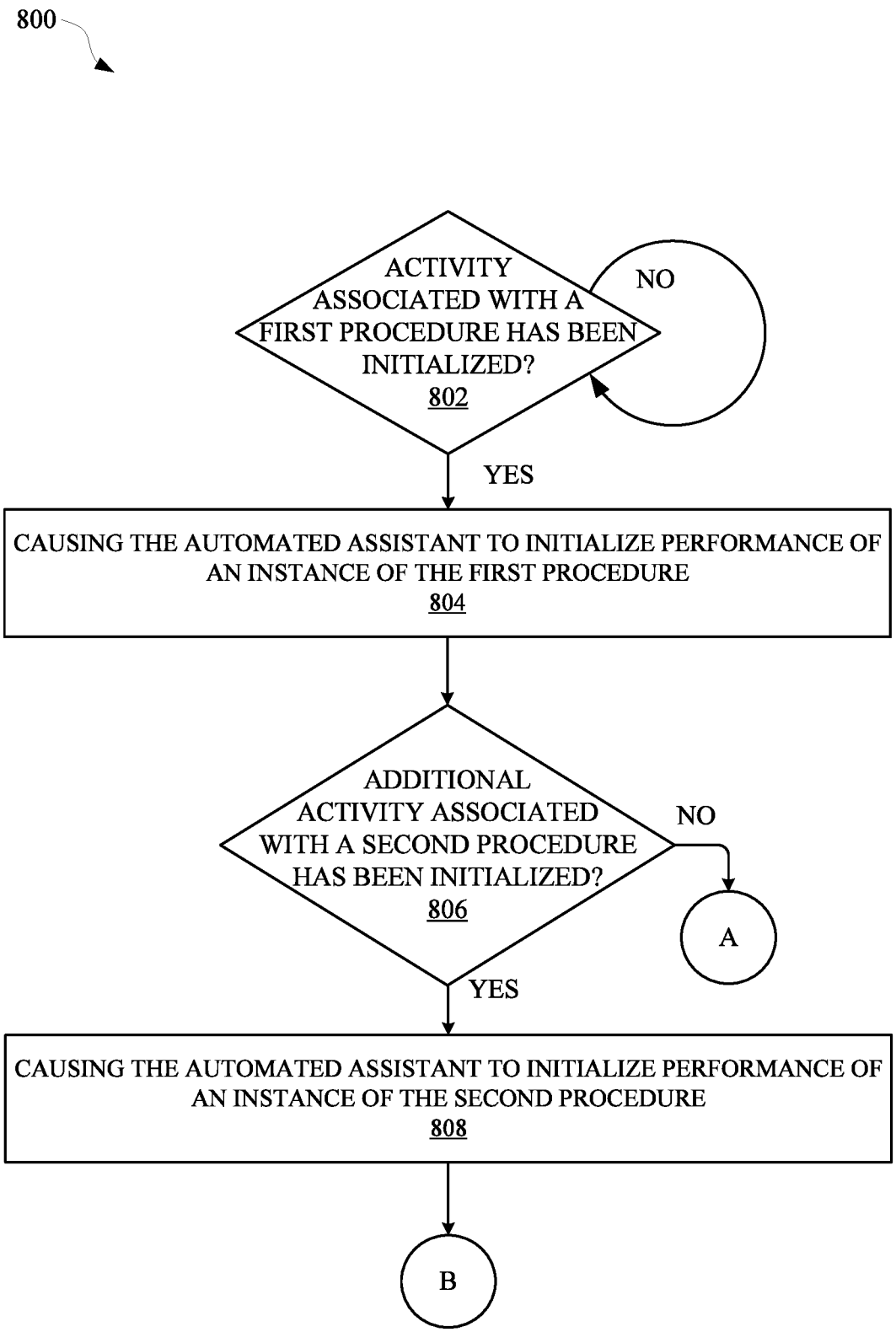
FIG. 8A and FIG. 8B illustrate a method causing an automated assistant to simultaneously perform a variety of different procedures that can cause the automated assistant to interact with one or more users, applications, and/or devices during performance of the procedures.
Figure 8B:
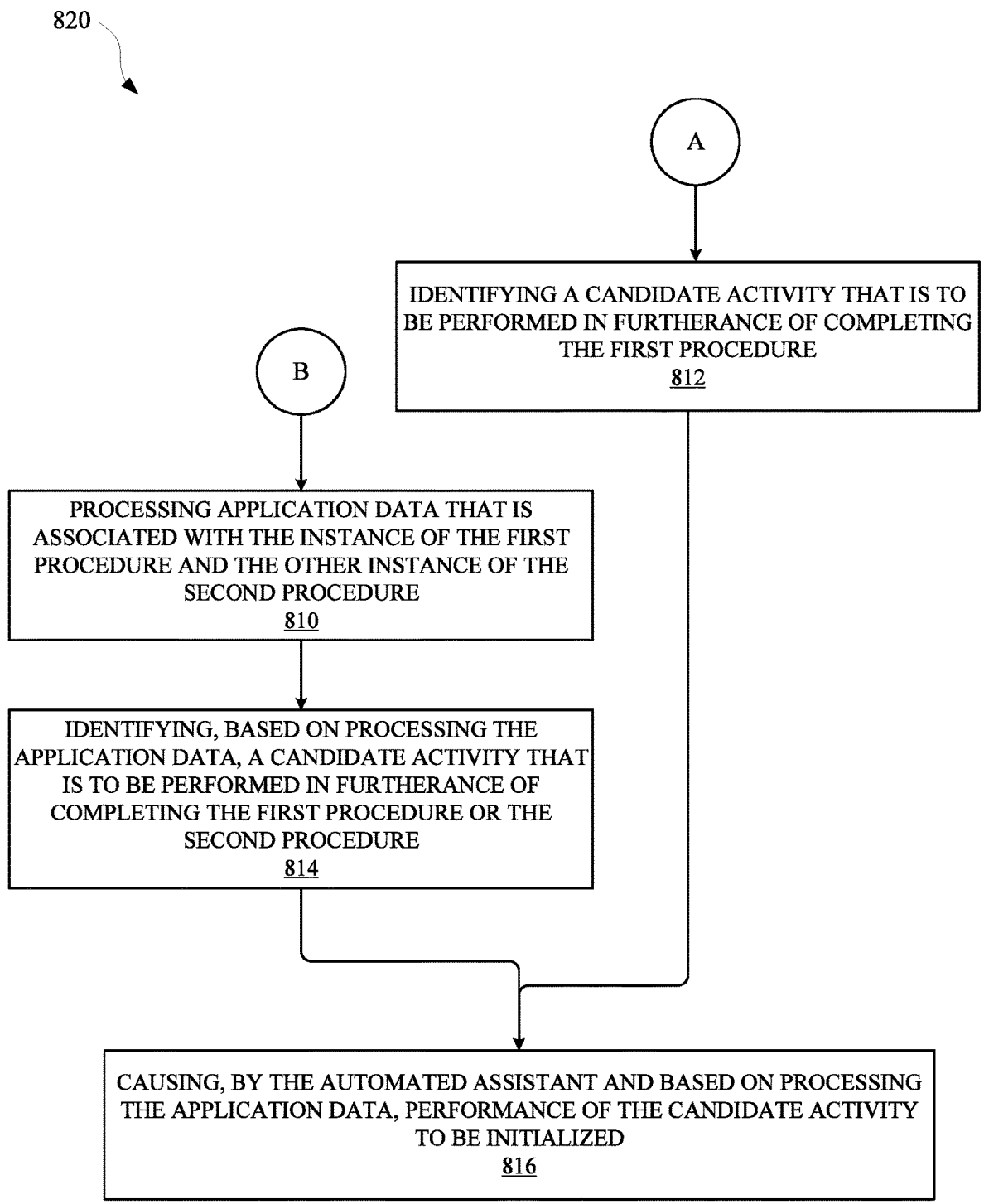

FIGS. 8A and 8B illustrate a method 800 causing an automated assistant to simultaneously perform a variety of different procedures that can cause the automated assistant to interact with one or more users, applications, and/or devices during performance of the procedures. The method 800 can be performed by one or more applications, computing devices, and/or any other apparatus or module capable of providing access to an automated assistant. Referring initially to FIG. 8A, the method 800 can include an operation 802 that involves determining, by an automated assistant, an activity that is associated with a first procedure that is being performed or has been performed. The activity can be determined to be associated with the first procedure based on prior instances in which the first procedure was performed at one or more computing devices that provide access to the automated assistant.

For example, a user who is performing tasks within an organization can rely on their respective automated assistant for assistance with various periodic tasks. During performance of such tasks, the automated assistant can access, with prior permission from the user, data characterizing various actions being performed in furtherance of certain procedures. When the automated assistant identifies a procedure that can be performed more efficiently with the assistance of the automated assistant, the automated assistant can establish trigger points for initializing performance of the procedure. As an example, receipt of certain information at a particular application can be an activity that triggers the automated assistant to initialize performance of the first procedure. When the activity is determined to have been performed and/or initialized, the method 800 can proceed to an operation 804. Otherwise, the automated assistant can continue to determine whether an activity associated with the first procedure has been performed.

The method 800 can further include an operation 804 that involves causing, based on the user engaging in the activity associated with the procedure, the automated assistant to initialize performance of an instance of the first procedure. The first procedure can be, for example, a procedure that assists the user with creating an itinerary for a trip that the user takes each month. Furthermore, the activity can involve the user accessing a travel planning application from their phone. In response to this activity being detected, the automated assistant can initialize performance of the first procedure by inputting certain dates into a GUI of the travel planning application and selecting a GUI element rendered at the GUI in order to cause the travel planning application to return certain flight options for the user.

The method 800 can further include an operation 806 that involves determining, by an automated assistant and prior to completion of the first procedure, that the user or another user is engaged in an additional activity that is associated with a second procedure. The automated assistant can perform this operation 806 by processing other data available to the automated assistant and/or the organization. The additional activity can be determined to be associated with the second procedure based on other prior instances in which the second procedure was performed at the one or more computing devices that provide access to the automated assistant. The additional activity associated with the second procedure can be initialized by a separate user, for example, when the second user is accessing an accounting application from their computer. The second procedure can therefore be a process for retrieving estimated figures in order to generate a report. However, when an additional activity is determined to have not been detected, the method 800 can proceed, via continuation element "A," to an operation 812 provided in method 820 of FIG. 8B.

When the additional activity is detected at the operation 806, the method 800 can proceed to an operation 808 that involves causing, based on the user or the other user engaging in the additional activity associated with the second procedure, the automated assistant to initialize performance of an instance of the second procedure. In some implementations, the instance of the second procedure can be initialized and cause the automated assistant to submit an API request to the accounting application in order to retrieve data that the second user typically accesses in order to complete the second procedure. The method 800 can proceed from the operation 808, via continuation element "B," to an operation 810 as provided in FIG. 8B.

The operation 810 can include processing, by the automated assistant, application data that is associated with the instance of the first procedure and the other instance of the second procedure. In some implementations, the application data can influence how the first procedure and/or the second procedure are executed via the automated assistant. For example, when the automated assistant has initialized the second procedure, the automated assistant can elect to modify one or more actions taken in furtherance of completing the first procedure. This decision point to modify the one or more actions can be based on prior instances in which one or more users were performing the first procedure and the second procedure, and the performance of the procedures affected one or more of their outcomes. For example, based on processing of application data associated with the trip planning application and the accounting application, the automated assistant can generate embeddings that can be used when determining how to perform subsequent instances of the first procedure and/or the second procedure. In this way, when the trip planning application and/or the accounting application render information during subsequent instances of these procedures, the automated assistant can reference the embeddings when processing the information. Based on this processing, distances to other embeddings in latent space can be identified in order to determine how to continue with the execution of the procedures. The method 800 can proceed from the operation 810 to an operation 814 thereafter.

The operation 814 can include identifying, based on processing the application data, a candidate activity that is to be performed in furtherance of completing the first procedure or the second procedure. For example, based on information generated via the accounting application, the automated assistant can determine to perform a candidate activity in order to book flights for a particular destination, as well as a certain type of rental car. However, when the information from the accounting application is different, the automated assistant can determine to perform a different candidate activity in order to book a different flight and/or a different rental car.

The method 800 can proceed from the operation 814 to an operation 816 of causing, by the automated assistant and based on processing the application data, performance of the candidate activity to be initialized. However, when the method 800 and the method 820 result in performance of the operation 812, the operation 812 can include identifying a candidate activity that is to be performed in furtherance of completing the first procedure. For example, the candidate activity can include bypassing booking a trip for a current period of time, but selecting a subsequent period of time to book a trip. This decision can be based on the accounting application not providing certain information, thereby bypassing causing the automated assistant to initialize performance of the second procedure.

Figure 9:
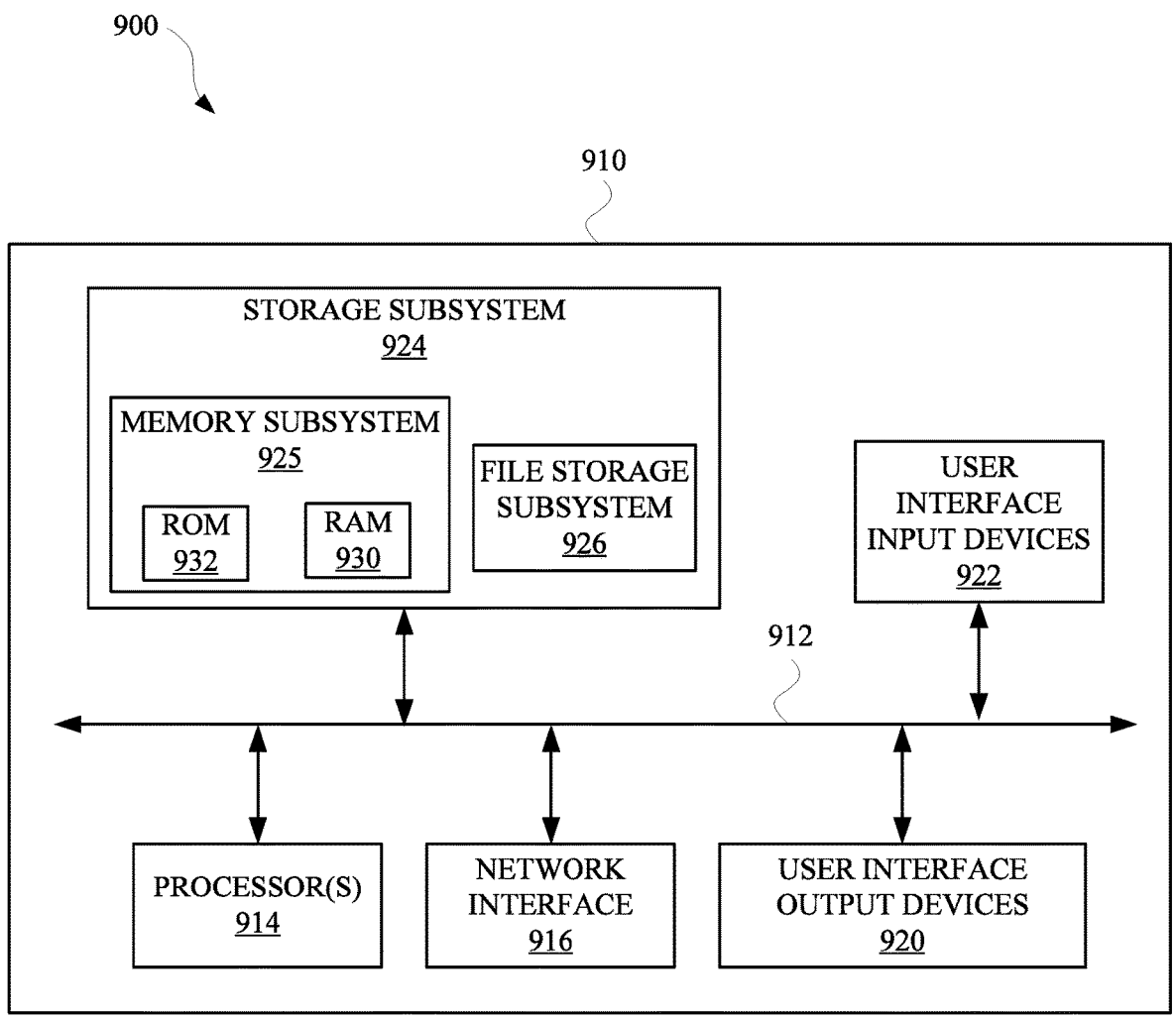
FIG. 9 is a block diagram of an example computer system.

FIG. 9 is a block diagram 900 of an example computer system 910. Computer system 910 typically includes at least one processor 914 which communicates with a number of peripheral devices via bus subsystem 912. These peripheral devices may include a storage subsystem 924, including, for example, a memory 925 and a file storage subsystem 926, user interface output devices 920, user interface input devices 922, and a network interface subsystem 916. The input and output devices allow user interaction with computer system 910. Network interface subsystem 916 provides an interface to outside networks and is coupled to corresponding interface devices in other computer systems.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computer system 910 or onto a communication network.

User interface output devices 920 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computer system 910 to the user or to another machine or computer system.

Storage subsystem 924 stores programming and data constructs that provide the functionality of some or all of the modules described herein. For example, the storage subsystem 924 may include the logic to perform selected aspects of method 300, method 400, method 500, method 600, method 700, method 800, and/or any combination of their respective operations, and/or to implement one or more of system 200, computing device 112, computing device 134, IoT device 136, and/or any other application, device, apparatus, and/or module discussed herein.

These software modules are generally executed by processor 914 alone or in combination with other processors. Memory 925 used in the storage subsystem 924 can include a number of memories including a main random access memory (RAM) 930 for storage of instructions and data during program execution and a read only memory (ROM) 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computer system 910 communicate with each other as intended. Although bus subsystem 912 is shown schematically as a single bus, alternative implementations of the bus subsystem may use multiple busses.

Computer system 910 can be of varying types including a workstation, server, computing cluster, blade server, server farm, or any other data processing system or computing device. Due to the ever-changing nature of computers and networks, the description of computer system 910 depicted in FIG. 9 is intended only as a specific example for purposes of illustrating some implementations. Many other configurations of computer system 910 are possible having more or fewer components than the computer system depicted in FIG. 9.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

In some implementations, a method implemented by one or more processors is set forth as including operations such as determining, by an automated assistant, that performance of an initial activity of an instance of a procedure has occurred. The initial activity is performed at a computing device that provides access to the automated assistant. The method can further include an operation of causing, based on the performance of the initial activity, the automated assistant to generate first action data, wherein the first action data characterizes one or more initial actions to be initialized by the automated assistant when performing the initial activity during a subsequent instance of the procedure. The method can further include an operation of determining, subsequent to the performance of the initial activity, that performance of a final activity in the instance of the procedure has occurred, wherein the final activity is performed at the computing device or another computing device that provides access to the automated assistant. The method can further include an operation of causing, based on the performance of the final activity, the automated assistant to generate second action data, wherein the second action data characterizes one or more final actions to be initialized by the automated assistant when performing the final activity during the subsequent instance of the procedure. The method can further include an operation of, subsequent to generating the first action data and the second action data: causing the automated assistant to initialize performance of the subsequent instance of the procedure using the first action data and the second action data.

In some implementations, the subsequent instance of the procedure is performed without a user directly instructing the automated assistant to perform the subsequent instance of the procedure. In some implementations, the method can further include an operation of determining, subsequent to determining that the performance of the initial activity of the instance of the procedure has occurred, that a user has performed a particular activity that is extraneous relative to the procedure, wherein, subsequent to generating the first action data and the second action data, and based on determining that the particular activity is extraneous, the automated assistant performs the subsequent instance of the procedure without performing the particular activity. In some implementations, wherein determining that the user has performed the particular activity that is extraneous includes: processing application data using a classification model, wherein the classification model is trained based on previous interactions between the user and an application that is accessible via the computing device, and wherein the application data characterizes one or more inputs provided to the application when the user is performing the particular activity.

In some implementations, determining that the user has performed the particular activity that is extraneous includes: processing activity data using a classification model, wherein the classification model is trained based on previous interactions between the user and an application that is accessible via the computing device, and wherein the activity data characterizes one or more features of the computing device when the user is performing the particular activity. In some implementations, one or more prior instances of the procedure have been performed previously via interactions between one or more users and one or more computing devices, and determining that the user has performed the particular activity that is extraneous includes: determining that one or more prior instances of the procedure lack any activity that satisfies a threshold similarity to the particular activity. In some implementations, determining that the user has performed the particular activity that is extraneous includes: determining that the extraneous activity has been omitted from one or more prior instances of the procedure. In some implementations, determining that the user has performed the particular activity that is extraneous includes: determining that the extraneous activity results in performance of an action that delays performance of the procedure and/or affects performance of a separate procedure.

In some implementations, determining that the performance of the initial activity of the instance of the procedure has occurred includes: processing application data using a classification model, wherein the classification model is trained based on previous interactions between a user and an application that is accessible via the computing device, and wherein the application data characterizes one or more inputs provided to the application when the user is performing the initial activity. In some implementations, the application data characterizes natural language content embodied in the one or more inputs to the application. In some implementations, the application data characterizes natural language content rendered in a graphical user interface of the application, and the first action data characterizes one or more inputs to be provided to the graphical user interface of the application during the subsequent instance of the procedure.

In some implementations, the one or more inputs provided to the graphical user interface of the application include a gesture input to a touch display interface of the computing device. In some implementations, determining that the performance of the initial activity of the instance of the procedure has occurred includes: processing application data using a classification model, wherein the classification model is trained based on a previous interaction between a user and one or more applications, and wherein the one or more initial actions include retrieving dynamic data from a first application of the one or more applications, and inputting the dynamic data to an interface of a second application of the one or more applications. In some implementations, determining that the performance of the final activity of the instance of the procedure has occurred includes: processing application data using a classification model, wherein the classification model is trained based on a previous interaction between the user and a separate user via an application, and wherein the application data characterizes the user providing, via the application, data to the separate user. In some implementations, the data is different than other data that was previously provided by the user to the separate user during the previous interaction.

In some implementations, a method implemented by one or more processors is set forth as including operations such as determining, by an automated assistant, that a user is engaged in an activity that is associated with a procedure, wherein the activity includes interacting with a computing device without directly interacting with the automated assistant. The method can further include an operation of causing, based on the user engaging in the activity associated with the procedure, the automated assistant to initialize performance of an initial action of an instance of the procedure, wherein completion of the initial action causes initial data to be accessible to the automated assistant. The method can further include an operation of identifying, based on the initial data, a candidate activity to be initialized by the automated assistant, wherein the candidate activity is identified based on a prior instance of the procedure that involved performance of the candidate activity. The method can further include an operation of determining, by the automated assistant, whether to initialize performance of the candidate activity, wherein the automated assistant determines whether to initialize performance of the candidate activity based on the initial data and activity data that is associated with the activity of the user. The method can further include an operation of, when the automated assistant determines to initialize performance of the candidate activity: causing the automated assistant to initialize performance of the candidate activity.

In some implementations, the method can further include an operation of, when the automated assistant determines to bypass initializing performance of the candidate activity: causing the automated assistant to initialize performance of a separate candidate activity. In some implementations, the candidate activity includes: causing an interface of the computing device to provide a prompt for the user to confirm that the automated assistant is permitted to initialize performance of an additional action in furtherance of completing the procedure. In some implementations, the candidate activity includes: causing the automated assistant to initialize performance of an additional action without providing a prompt for the user to confirm that the automated assistant is permitted to initialize performance of the additional action. In some implementations, causing the automated assistant to initialize performance of the candidate activity includes: causing the automated assistant to communicate the initial data to a separate user.

In some implementations, determining whether to initialize performance of the candidate activity includes: processing the activity data using a trained machine learning model that is trained using training data that is generated based on the prior instance of the procedure that involved performance of the candidate activity. In some implementations, the initial activity includes accessing, by the user, a message from a separate user, and wherein the initial action of the instance of the procedure includes providing a responsive message to the separate user. In some implementations, identifying the candidate activity includes: processing the initial data using one or more trained machine learning models that are trained based on prior performances of the procedure in which the separate user provided information to the user.

In some implementations, a method implemented by one or more processors is set forth as including operations such as receiving, by an application, a user input from a user who is accessing the application via a computing device that provides access to an automated assistant, wherein the user input is provided directly to an interface of the application in furtherance of the user completing an instance of a procedure. The method can further include an operation of receiving, from the automated assistant, a request for the application to communicate application data to the automated assistant, wherein the request is provided by the automated assistant in response to the automated assistant determining that the user is accessing the application in furtherance of completing the instance of the procedure. The method can further include an operation of providing, based on the request, the application data to the automated assistant, wherein the application data is accessed by the application in response to the user input from the user. The method can further include an operation of causing, based on the automated assistant receiving the application data, the automated assistant to initialize performance of an action in furtherance of completing the instance of the procedure.

In some implementations, causing the automated assistant to initialize performance of the action includes: causing the automated assistant to communicate the application data to an additional application that is different from the application and the automated assistant. In some implementations, causing the automated assistant to initialize performance of the action includes: causing the automated assistant to communicate a message to a separate user that is different from the user, wherein the message includes natural language content that is based on the application data provided by the application. In some implementations, the method can further include receiving, from the separate user, an additional message that is responsive to the message provided by the automated assistant, wherein the additional message is based on: an interaction between the separate user and a separate instance of the automated assistant, or another interaction between the separate user and a different automated assistant.

In some implementations, the method can further include an operation of causing, based on the additional message, the automated assistant to initialize performance of an additional action in furtherance of completing the instance of the procedure, wherein the automated assistant identifies the additional action to perform based on the user interacting with the separate user during one or more prior instances of the procedure. In some implementations, causing the automated assistant to initialize performance of the additional action includes: causing the automated assistant to communicate with the user based on the other natural language content.

In some implementations, a method implemented by one or more processors is set forth as including operations such as determining, by an automated assistant, that a user is engaged in an activity that is associated with a procedure, wherein the activity includes interacting with a computing device without directly interacting with the automated assistant. The method can further include causing, based on the user engaging in the activity associated with the procedure, the automated assistant to initialize performance of an initial action of an instance of the procedure, wherein performance of the initial action causes initial data to be available to a separate user. The method can further include an operation of receiving, by the automated assistant, responsive data that characterizes a response of the separate user to receiving the initial data, wherein the responsive data is based on: an interaction between the separate user and a separate instance of the automated assistant, or another interaction between the separate user and a different automated assistant. The method can further include an operation of determining, based on the responsive data, whether to initialize performance of a candidate activity, wherein automated assistant initializes performance of the candidate activity further based on activity data that is associated with the activity of the user. The method can further include an operation of causing, based on the responsive data and the activity data, the automated assistant to initialize performance of the candidate activity.

In some implementations, determining whether to initialize performance of the candidate activity includes: identifying the candidate activity based on a prior instance of the procedure that involved the candidate activity. In some implementations, the candidate activity includes: causing an interface of the computing device to provide a prompt for the user to confirm that the automated assistant is permitted to initialize performance of the candidate activity in furtherance of completing the procedure. In some implementations, the candidate activity includes: causing the automated assistant to initialize performance of the additional action without providing a prompt for the user to confirm that the automated assistant is permitted to initialize performance of an action in furtherance of completing the procedure. In some implementations, determining whether to initialize performance of the candidate activity includes: processing the activity data using a trained machine learning model that is trained using training data that is generated based on the prior instance of the procedure that involved the candidate activity.

In some implementations, causing the automated assistant to initialize performance of the candidate activity includes: causing the automated assistant to communicate additional data to another separate user that is different from the user and the separate user. In some implementations, the initial activity includes receiving, by the user and from the separate user, a message that includes the initial data, and the initial action of the instance of the procedure includes providing another message to the separate user via the messaging application.

In some implementations, a method implemented by one or more processors is set forth as including operations such as determining, by an automated assistant, that the user is engaged in an activity that is associated with a first procedure, wherein the activity is determined to be associated with the first procedure based on prior instances in which the first procedure was performed at one or more computing devices that provide access to the automated assistant. The method can further include an operation of causing, based on the user engaging in the activity associated with the procedure, the automated assistant to initialize performance of an instance of the first procedure. The method can further include an operation of determining, by an automated assistant and prior to completion of the first procedure, that the user or another user is engaged in an additional activity that is associated with a second procedure, wherein the additional activity is determined to be associated with the second procedure based on other prior instances in which the second procedure was performed at the one or more computing devices that provide access to the automated assistant. The method can further include an operation of causing, based on the user or the other user engaging in the additional activity associated with the second procedure, the automated assistant to initialize performance of another instance of the second procedure prior to completion of the instance of the first procedure. The method can further include an operation of processing, by the automated assistant, application data that is associated with the instance of the first procedure and the other instance of the second procedure. The method can further include an operation of identifying, based on processing the application data, a candidate activity that is to be performed in furtherance of completing the first procedure or the second procedure. The method can further include an operation of causing, by the automated assistant and based on processing the application data, performance of the candidate activity to be initialized.

In some implementations, the application data is processed using one or more trained machine learning models, and the one or more trained machine learning models are trained based on prior instances in which the first procedure and the second procedure were completed. In some implementations, the application data is provided by one or more applications that are separate from the automated assistant, and the activity and the additional activity include interacting with the one or more applications. In some implementations, the candidate activity includes: causing an interface of the one or more computing device to provide a prompt for the user or the other user to confirm that the automated assistant is permitted to initialize performance of an action in furtherance of completing the first procedure or the second procedure.

In some implementations, the candidate activity includes: causing the automated assistant to initialize performance of an action without providing a prompt for the user or the other user to confirm that the automated assistant is permitted to initialize performance of an action in furtherance of completing the first procedure or the second procedure. In some implementations, the method can include an operation of, prior to causing performance of the candidate activity to be initialized: storing a first state of the instance of the first procedure and a second state of the other instance the second procedure. In some implementations, the method can further include communicating, by the automated assistant, the first state of the instance of the first procedure and the second state of the second procedure to be communicated to: a separate instance of the automated assistant, or a different automated assistant.

In some implementations, the method can further include receiving the application data from: the separate instance of the automated assistant, or from the different automated assistant. In some implementations, the application data characterizes information that is based on: an interaction between a separate user and the separate instance of the automated assistant, or another interaction between the separate user and the different automated assistant. In some implementations, the activity includes receiving, by the user, a message from the separate user, and the additional activity includes receiving, by the user or the other user, another message from the separate user.

In some implementations, a method implemented by one or more processors is set forth as including operations such as determining, by an automated assistant, that an activity that is associated with a procedure has been initialized, wherein the activity is performed at a computing device that provides access to an automated assistant. The method can further include an operation of causing, based on the activity associated with the procedure being initialized, the automated assistant to initialize performance of an initial action of an instance of the procedure, wherein performance of the initial action causes initial data to be provided to an additional automated assistant, and wherein the additional automated assistant is a separate instance of the automated assistant or is a different automated assistant. The method can further include an operation of receiving, by the automated assistant, responsive data that characterizes a response of the separate automated assistant or the additional automated assistant to the initial data. The method can further include an operation of determining, based on the responsive data, whether to initialize performance of a candidate activity, wherein automated assistant initializes performance of the candidate activity further based on activity data that is associated with the activity. The method can further include an operation of causing, based on the responsive data and the activity data, the automated assistant to initialize performance of the candidate activity.

In some implementations, determining whether to initialize performance of the candidate activity includes: identifying the candidate activity based on a prior instance of the procedure that involved the candidate activity. In some implementations, the candidate activity includes: causing an interface of the computing device to provide a prompt for a user to confirm that the automated assistant is permitted to initialize performance of the candidate activity in furtherance of completing the procedure. In some implementations, the candidate activity includes: causing the automated assistant to initialize performance of an additional action without providing a prompt for a user to confirm that the automated assistant is permitted to initialize performance of the additional action in furtherance of completing the procedure.

In some implementations, determining whether to initialize performance of the candidate activity includes: processing the activity data using a trained machine learning model that is trained using training data that is generated based on a prior instance of the procedure that involved the candidate activity. In some implementations, causing the automated assistant to initialize performance of the candidate activity includes: causing the automated assistant to communicate additional data to a separate user via the additional automated assistant. In some implementations, the initial activity includes receiving, by a user of the automated assistant, a message that includes the initial data, and the initial action of the instance of the procedure includes providing another message to the separate user via the automated assistant.

In some implementations, causing the automated assistant to initialize performance of an initial action of an instance of the procedure includes: generating an application programming interface (API) command that, when executed, causes the initial data to be communicated from the automated assistant to the additional automated assistant. In some implementations, the method can further include, subsequent to causing the automated assistant to initialize performance of the candidate activity: generating interaction data that characterizes one or more interactions between: the automated assistant and the additional automated assistant; and causing the automated assistant to render the interaction data for a user at an interface of the computing device or a separate computing device. In some implementations, the method can further include, subsequent to causing the automated assistant to initialize performance of the candidate activity: generating interaction data that characterizes information communicated between the automated assistant and the additional automated assistant during execution of the candidate activity; and causing the automated assistant to render the interaction data for a user at an interface of the computing device or a separate computing device.

We claim:

1. A method implemented by one or more processors, the method comprising:
   determining, by a second automated assistant of a second computing device, that performance of an initial activity of an instance of a procedure has occurred,
      wherein the initial activity is performed by a first automated assistant of a first computing device in response to input from a first user provided to the first automated assistant;
   causing, based on the performance of the initial activity, the first automated assistant to generate first action data accessible by the second automated assistant,
      wherein the first action data characterizes one or more initial actions to be initialized by the second automated assistant when performing the initial activity during a subsequent instance of the procedure;
   determining, by the first automated assistant subsequent to the performance of the initial activity, that performance of a final activity by the second automated assistant in the instance of the procedure has occurred,
      wherein performance of the final activity by the second automated assistant is responsive to input from a second user being provided to the second automated assistant;
   causing, based on the performance of the final activity, the second automated assistant to generate second action data,
      wherein the second action data characterizes one or more final actions to be initialized by the first automated assistant when performing the final activity during the subsequent instance of the procedure; and
   subsequent to generating the first action data and the second action data:
      causing the first automated assistant and the second automated assistant to initialize performance of the subsequent instance of the procedure using the first action data and the second action data without receiving subsequent input from the first user and/or the second user.

2. The method of claim 1, wherein the subsequent instance of the procedure is performed without a user directly instructing the first automated assistant and/or the second automated assistant to perform the subsequent instance of the procedure.

3. The method of claim 1, further comprising:
determining, subsequent to determining that the performance of the initial activity of the instance of the procedure has occurred, that a user has performed a particular activity that is extraneous relative to the procedure,
wherein, subsequent to generating the first action data and the second action data, and based on determining that the particular activity is extraneous, the first automated assistant and/or second automated assistant performs the subsequent instance of the procedure without performing the particular activity.

4. The method of claim 3, wherein determining that the user has performed the particular activity that is extraneous includes:
processing application data using a classification model, wherein the classification model is trained based on previous interactions between the user and an application that is accessible via the first computing device and/or the second computing device, and
wherein the application data characterizes one or more inputs provided to the application when the user is performing the particular activity.

5. The method of claim 3, wherein determining that the user has performed the particular activity that is extraneous includes:
processing activity data using a classification model, wherein the classification model is trained based on previous interactions between the user and an application that is accessible via the first computing device and/or the second computing device, and
wherein the activity data characterizes one or more features of the first computing device and/or second computing device when the user is performing the particular activity.

6. The method of claim 3,
wherein one or more prior instances of the procedure have been performed previously via interactions between one or more users and one or more computing devices, and
wherein determining that the user has performed the particular activity that is extraneous includes:
determining that one or more prior instances of the procedure lack any activity that satisfies a threshold similarity to the particular activity.

7. The method of claim 1, wherein determining that the performance of the initial activity of the instance of the procedure has occurred includes:
processing application data using a classification model, wherein the classification model is trained based on previous interactions between a user and an application that is accessible via the first computing device and/or second computing device, and
wherein the application data characterizes one or more inputs provided to the application when the user is performing the initial activity.

8. The method of claim 7, wherein the application data characterizes natural language content embodied in the one or more inputs to the application.

9. The method of claim 7,
wherein the application data characterizes natural language content rendered in a graphical user interface of the application, and
wherein the first action data characterizes one or more inputs to be provided to the graphical user interface of the application during the subsequent instance of the procedure.

10. The method of claim 9, wherein the one or more inputs provided to the graphical user interface of the application include a gesture input to a touch display interface of the first computing device and/or the second computing device.

11. The method of claim 1, wherein determining that the performance of the initial activity of the instance of the procedure has occurred includes:
processing application data using a classification model, wherein the classification model is trained based on a previous interaction between a user and one or more applications, and
wherein the one or more initial actions include retrieving dynamic data from a first application of the one or more applications, and inputting the dynamic data to an interface of a second application of the one or more applications.

12. The method of claim 1, wherein determining that the performance of the final activity of the instance of the procedure has occurred includes:
processing application data using a classification model, wherein the classification model is trained based on a previous interaction between the user and a separate user via an application, and
wherein the application data characterizes the user providing, via the application, data to the separate user.

13. The method of claim 12, wherein the data is different than other data that was previously provided by the user to the separate user during the previous interaction.

14. A system comprising:
one or more computers and one or more storage devices storing instructions that are operable, when executed by the one or more computers, to cause to the one or more computers to perform operations comprising:
determining, by a second automated assistant of a second computing device, that performance of an initial activity of an instance of a procedure has occurred,
wherein the initial activity is performed by a first automated assistant of a first computing device in response to input from a first user provided to the first automated assistant;
causing, based on the performance of the initial activity, the first automated assistant to generate first action data accessible by the second automated assistant,
wherein the first action data characterizes one or more initial actions to be initialized by the second automated assistant when performing the initial activity during a subsequent instance of the procedure;
determining, by the first automated assistant subsequent to the performance of the initial activity, that performance of a final activity by the second automated assistant in the instance of the procedure has occurred, wherein performance of the final activity by the second automated assistant is responsive to input from a second user being provided to the second automated assistant;
causing, based on the performance of the final activity, the second automated assistant to generate second action data,
wherein the second action data characterizes one or more final actions to be initialized by the first automated assistant when performing the final activity during the subsequent instance of the procedure; and subsequent to generating the first action data and the second action data:

causing the first automated assistant and the second automated assistant to initialize performance of the subsequent instance of the procedure using the first action data and the second action data without receiving subsequent input from the first user and/or the second user.

15. The system of claim 14, wherein the subsequent instance of the procedure is performed without a user directly instructing the first automated assistant and/or the second automated assistant to perform the subsequent instance of the procedure.

16. The system of claim 14, further comprising:

determining, subsequent to determining that the performance of the initial activity of the instance of the procedure has occurred, that a user has performed a particular activity that is extraneous relative to the procedure, wherein, subsequent to generating the first action data and the second action data, and based on determining that the particular activity is extraneous, the first automated assistant and/or second automated assistant performs the subsequent instance of the procedure without performing the particular activity.

17. The system of claim 16, wherein determining that the user has performed the particular activity that is extraneous includes:

processing application data using a classification model, wherein the classification model is trained based on previous interactions between the user and an application that is accessible via the first computing device and/or the second computing device, and wherein the application data characterizes one or more inputs provided to the application when the user is performing the particular activity.

18. The system of claim 16, wherein determining that the user has performed the particular activity that is extraneous includes:

processing activity data using a classification model, wherein the classification model is trained based on previous interactions between the user and an application that is accessible via the first computing device and/or the second computing device, and wherein the activity data characterizes one or more features of the first computing device and/or second computing device when the user is performing the particular activity.

19. The system of claim 16, wherein one or more prior instances of the procedure have been performed previously via interactions between one or more users and one or more computing devices, and wherein determining that the user has performed the particular activity that is extraneous includes:

determining that one or more prior instances of the procedure lack any activity that satisfies a threshold similarity to the particular activity.

20. One or more non-transitory computer-readable media having instructions stored thereon that, when executed by one or more processors, cause the one or more processors to initiate operations comprising:

determining, by a second automated assistant of a second computing device, that performance of an initial activity of an instance of a procedure has occurred, wherein the initial activity is performed by a first automated assistant of a first computing device in response to input from a first user provided to the first automated assistant;

causing, based on the performance of the initial activity, the first automated assistant to generate first action data accessible by the second automated assistant, wherein the first action data characterizes one or more initial actions to be initialized by the second automated assistant when performing the initial activity during a subsequent instance of the procedure;

determining, by the first automated assistant subsequent to the performance of the initial activity, that performance of a final activity by the second automated assistant in the instance of the procedure has occurred, wherein performance of the final activity by the second automated assistant is responsive to input from a second user being provided to the second automated assistant;

causing, based on the performance of the final activity, the second automated assistant to generate second action data, wherein the second action data characterizes one or more final actions to be initialized by the first automated assistant when performing the final activity during the subsequent instance of the procedure; and subsequent to generating the first action data and the second action data:

causing the first automated assistant and the second automated assistant to initialize performance of the subsequent instance of the procedure using the first action data and the second action data without receiving subsequent input from the first user and/or the second user.

\* \* \* \* \*